(12) United States Patent
Jacobson et al.

(10) Patent No.: US 12,316,693 B2
(45) Date of Patent: *May 27, 2025

(54) RESPONDING TO AMBIGUOUS PLAY REQUESTS

(71) Applicant: Spotify AB, Stockholm (SE)

(72) Inventors: Kurt Jacobson, Stoneham, MA (US); Marcus Daniel Better, Arlington, MA (US); Philip Edmonds, Arlington, MA (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,717

(22) Filed: Oct. 25, 2023

(65) Prior Publication Data

US 2024/0073270 A1 Feb. 29, 2024

Related U.S. Application Data

(63) Continuation of application No. 17/831,548, filed on Jun. 3, 2022, now Pat. No. 11,838,344, which is a continuation of application No. 17/192,132, filed on Mar. 4, 2021, now Pat. No. 11,381,618, which is a continuation of application No. 16/193,920, filed on Nov. 16, 2018, now Pat. No. 10,958,698.

(51) Int. Cl.
*H04L 65/613* (2022.01)
*G06F 3/16* (2006.01)

(52) U.S. Cl.
CPC ............ *H04L 65/613* (2022.05); *G06F 3/167* (2013.01)

(58) Field of Classification Search
CPC ........ G06F 3/167; G06F 3/0482; G06F 21/32; G06F 21/35; G06F 3/165; G06F 16/435; G06F 16/438; G06F 16/3329; G06F 16/433; G06F 16/48; G06F 3/013; G06F 16/65; G06F 16/90332; G06F 3/0481; G06F 3/04842; G06F 40/279; G06F 40/35; G06F 15/02; G06F 3/16; G06F 16/45;

(Continued)

(56) References Cited

U.S. PATENT DOCUMENTS 8,073,854 B2   12/2011   Whitman
10,057,630 B1   8/2018   Panchaksharaiah
(Continued)

FOREIGN PATENT DOCUMENTS

EP   3291564   3/2018
WO   2006/103602   10/2006

OTHER PUBLICATIONS

European Search Report in corresponding Application 19209600, mailed Mar. 24, 2020, 6 pages.

(Continued)

*Primary Examiner* — Djenane M Bayard
(74) *Attorney, Agent, or Firm* — McDonnell Boehnen Hulbert & Berghoff LLP

(57) ABSTRACT

A request to play a media content item is received. It is determined whether the play request is ambiguous. Responsive to determining that the play request is ambiguous, then it is determined whether to play a suspended media content item or an alternate media content item. The determination can be made based on a length of time that the suspended media content item has been suspended, a media content item type, or a state, among other factors. Responsive to the determination, playback of the suspended or alternate media content item is initiated.

20 Claims, 10 Drawing Sheets

(58) Field of Classification Search
CPC .... G06F 16/483; G06F 16/487; G06F 16/489; G06F 16/9535; G06F 3/0488; G06F 40/30; G06F 40/284; G06F 16/3344; G06F 1/3203; G06F 1/3218; G06F 16/2453; G06F 16/3343; G06F 16/68; G06F 16/686; G06F 2203/04804; G06F 3/011; G06F 3/017; G06F 3/0304; G06F 3/03547; G06F 3/04815; G06F 3/04886; G06F 3/14; G06F 40/216; G06F 40/40; G06F 1/163; G06F 15/00; H04L 65/4015; H04L 43/0811; H04L 65/1069; H04L 65/403; H04L 41/0893; H04L 41/0895; H04L 41/40; H04L 43/20; H04L 67/025; H04L 67/12; H04L 67/566; H04L 69/28; H04L 65/613; H04L 67/52; H04L 41/0806; H04L 41/22; H04L 43/08; H04L 67/14; H04L 65/612; H04L 63/083; H04L 65/1059; H04L 65/762; H04L 67/06; H04L 67/1095; H04L 67/303; H04L 12/28; H04L 47/10; H04L 65/752; H04L 65/80

See application file for complete search history.

(56) References Cited

U.S. PATENT DOCUMENTS

| | | |
|---|---|---|
| 10,958,698 B2 | 3/2021 | Jacobson |
| 11,838,344 B2 | 12/2023 | Jacobson |
| 2010/0020202 A1 | 1/2010 | Ogawa |
| 2011/0235996 A1 | 9/2011 | Ikeda |
| 2012/0257766 A1 | 10/2012 | Seymour |
| 2012/0270644 A1* | 10/2012 | Buhr ............... A63F 13/71 463/29 |
| 2013/0347025 A1* | 12/2013 | Prakash ......... H04N 21/25875 725/25 |
| 2014/0282755 A1* | 9/2014 | Alsina ............ H04N 21/4751 725/88 |
| 2015/0163558 A1 | 6/2015 | Wheatley |
| 2015/0382047 A1 | 12/2015 | Van Os et al. |
| 2015/0382079 A1* | 12/2015 | Lister ............. H04N 5/783 725/38 |
| 2016/0057469 A1 | 2/2016 | Morris |
| 2016/0323482 A1 | 11/2016 | Chung |
| 2017/0068423 A1 | 3/2017 | Napolitano et al. |
| 2017/0068670 A1 | 3/2017 | Orr et al. |
| 2017/0242653 A1 | 8/2017 | Lang |
| 2018/0109587 A1 | 4/2018 | Spilka et al. |
| 2018/0189226 A1 | 7/2018 | Hofverberg et al. |
| 2018/0189306 A1 | 7/2018 | Lamere et al. |
| 2019/0268632 A1 | 8/2019 | Foerster et al. |
| 2021/0337002 A1 | 10/2021 | Jacobson |

OTHER PUBLICATIONS

European Extended Search Report in Application 21198952.0, mailed Jan. 18, 2022, 8 pages.

European Communication pursuant to Article 94(3) EPC in Application 21198952.0, mailed Nov. 27, 2023, 6 pages.

* cited by examiner

RESPONDING TO AMBIGUOUS PLAY REQUESTS

CROSS REFERENCE TO RELATED APPLICATIONS

This application claims priority to and is a continuation of U.S. patent application Ser. No. 17/831,548, filed Jun. 3, 2022, which is a continuation of Ser. No. 17/192,132, filed Mar. 4, 2021, now U.S. Pat. No. 11,381,618, issued on Jun. 5, 2022, which is a continuation of U.S. patent application Ser. No. 16/193,920, filed Nov. 16, 2018, now U.S. Pat. No. 10,958,698, issued Mar. 23, 2021, and which applications are incorporated herein by reference in their entirety.

TECHNICAL FIELD

Example aspects described herein relate generally to media-playback systems that respond to play requests.

BACKGROUND

Current technology allows media-playback devices to receive streams of media content across networks from streaming services. Streaming services allow media-playback devices to play media content from a much larger collection of media than would otherwise be possible. Streaming services store media content on servers remote from the media-playback devices and then send the media content to the electronic devices when requested. For instance, a media-playback device can send a playback request to a streaming service that includes an identification of a media content item (e.g., a song) or a media content context (e.g., playlist) to play. But not all requests include an identification of what should be played. For example, a smart speaker system may receive the utterance "play" as input without an indication of what to play. Currently, responsive to such requests, a media-playback device simply resumes playback if the media-playback device is in a paused state. If the media-playback device is not in a paused state, then the media-playback device plays a content item from a library of media content items (e.g., the alphabetically first media content item of a media content item library). But this rigid approach provides a poor user experience because users may not always want to resume a media content item or not always want to play a different media content item. By choosing the option contrary to what the user wanted, the media-playback device wastes computing resources. There exists a need for technology to respond to ambiguous play requests in an improved manner.

SUMMARY

The present disclosure provides methods, apparatuses, and computer-readable products for responding to ambiguous play requests.

In an example, there is a method comprising: receiving a play request; determining whether the play request is ambiguous; determining an account associated with the play request; identifying playback state information of the account; responsive to determining that the play request is ambiguous, determining whether to play a suspended media content item; and initiating playback of the media content item other than the suspended media content item. In an example, determining whether to play the suspended media content item includes: determining, using the playback state information, that playback of a suspended media content item has been suspended for a suspend time; and determine to initiate playback of an alternate media content item based on determining that the suspend time satisfies a threshold, wherein the alternate media content item is a media content item other than the suspended media content item;

In some examples, determining whether to play the suspended media content item further includes: determining a current state; and determining a prior state, wherein the prior state is a state that was current when the suspended media content item was last played, wherein determining to initiate playback of the alternate media content item is further based on the current state and the prior state. In some examples, receiving the play request comprises receiving an utterance over a voice-based user interface. In examples, receiving the play request further includes: providing the utterance to a natural language understanding system; and receiving an output from the natural language understanding system. In examples, determining that the play request is ambiguous includes: determining that the output includes a play intent and lacks a slot value indicating a media content item to play; and responsive to determining that the output includes the play intent and lacks a slot value indicating a media content item to play, determining that the play request is ambiguous. In examples, receiving the play request includes detecting actuation of a hardware play button. In examples, receiving the play request includes detecting actuation of a virtual play button. In examples, determining whether to play the suspended media content item includes: determining a media content type of the suspended media content item. In examples, initiating playback of the alternate media content item is further based on the media content type. In examples, the media content type is a song, a podcast, a radio station, an audiobook, a movie, or a television show. In examples, the method further includes setting the threshold based on the media content type. In examples, receiving the play request includes receiving the play request from a media-playback device at a media-delivery system.

In an example, there is a computer-readable medium having stored thereon instructions that, when executed by one or more processors cause execution of operations. The operations include: receiving a play request; determining an account associated with the play request; identifying playback state information of the account; determining whether the play request is ambiguous; responsive to determining that the play request is ambiguous, determining whether to play a suspended media content item; responsive to determining that the suspend time satisfies the threshold, initiating playback of an alternate media content item; and responsive to determining that the suspend time does not satisfy the threshold, resuming the playback of the suspended media content item. In examples, determining whether to play the suspended media content item includes: determining, using the playback state information, that playback of the suspended media content item has been suspended for a suspend time; and determining whether the suspend time satisfies a threshold.

In examples, the instructions further cause execution of operations including: determining a current state; and determining a prior state, wherein the prior state is a state that was current when the suspended media content item was last played. In examples, initiating playback of the alternate media content item is further based on the current state and the prior state. In examples, the instructions further cause the execution of operations including: determining a media content type of the suspended media content item; and determining the threshold based on the media content type. In examples, initiating playback of the alternate media content item is further based on the media content type. In examples, the media content type is a song, a podcast, a radio station, an audiobook, a movie, or a television show.

In an example, there is a media-playback system comprising: a media-playback device comprising a user interface; and a media-delivery system. In examples, the media-playback device is configured to: receive a play request over the user interface; send the play request to one or more of the media-delivery system; receive a media content item from the media-delivery system in response to sending the play request; and play the media content item. In examples, the media-delivery system is configured to: receive the play request from the media-playback device; determine an account associated with the play request; identifying playback state information of the account; determining whether the play request is ambiguous; responsive to determining that the play request is ambiguous, determining, using the playback state information, that playback of a recently-played media content item has been suspended for a suspend time; determining whether the suspend time satisfies a threshold; responsive to determining that the suspend time satisfies the threshold, sending an alternate media content item to the media-playback device for playback; and responsive to determining that the suspend time does not satisfy the threshold, sending the suspended media content item to the media-playback device for playback.

In some examples, the user interface includes a hardware play button and receiving the play request includes detecting actuation of the hardware play button. In some examples, the user interface includes a voice-based user interface; and wherein receiving the play request includes receiving an utterance over the voice-based user interface.

In some examples, the media-delivery system is further configured to: provide the utterance to a natural language understanding system; and receive an output from the natural language understanding system. In some examples, determining whether the play request is ambiguous includes: determining that the output includes a play intent and lacks a slot value indicating a media content item to play; and responsive to determining that the output includes the play intent and lacks a slot value indicating a media content item to play, determining that the play request is ambiguous. In some examples, the media-delivery system is further configured to: determine a media content type of the suspended media content item, wherein the media content type is a song, a podcast, a radio station, an audiobook, a movie, or a television show; and determine the threshold based on a type of the suspended media content item. In some examples, initiating playback of alternate media content is further based on the media content type.

BRIEF DESCRIPTION OF THE DRAWINGS

The features and advantages of the present disclosure will become more apparent from the detailed description set forth below when taken in conjunction with the following drawings.

DETAILED DESCRIPTION

Figure 1:
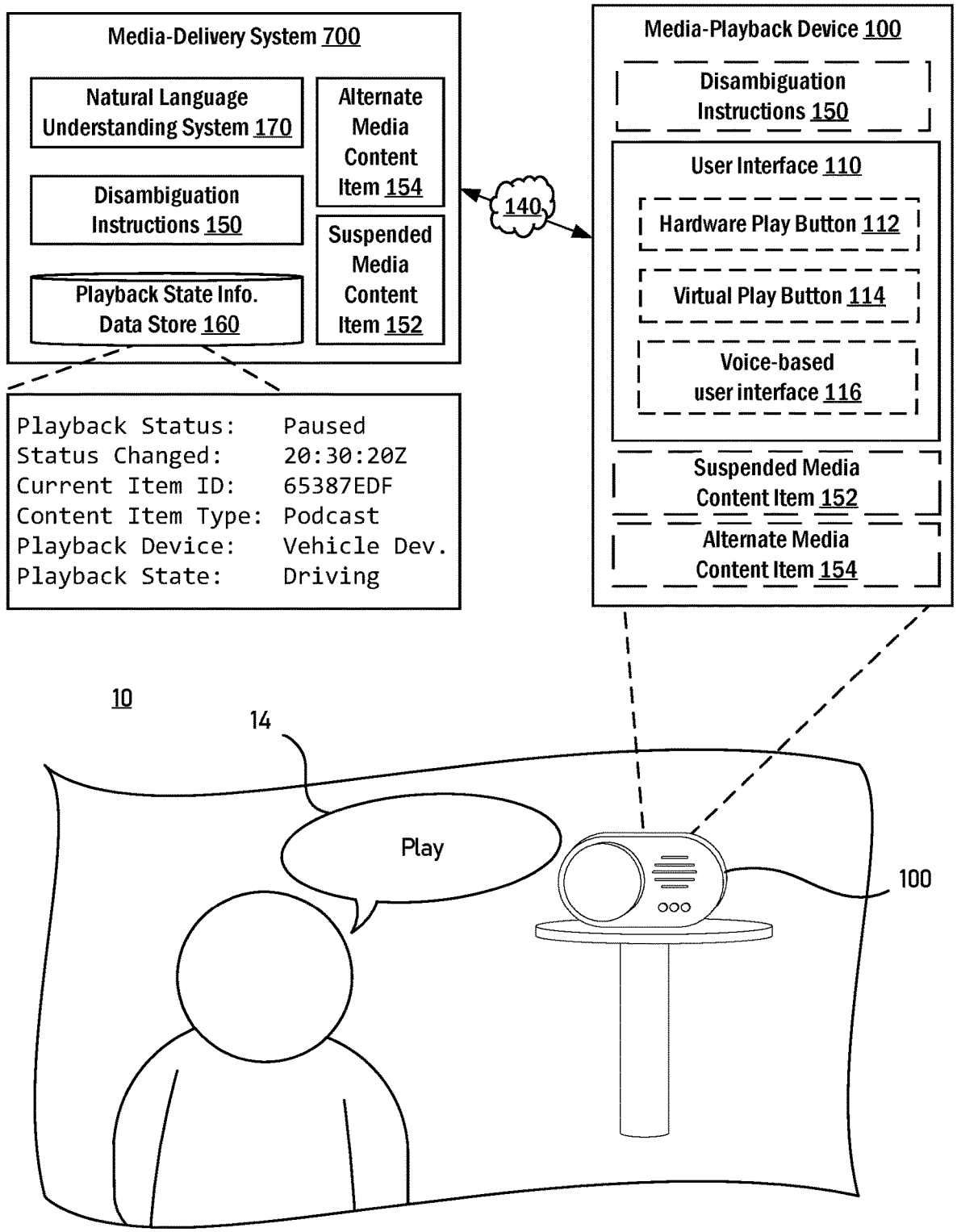
FIG. 1 illustrates an example media-playback system able to respond to a play request that is ambiguous.

The example embodiments presented herein are directed technical solutions for responding to ambiguous play requests that are implemented on media-playback systems having a media-playback device such as a mobile device running a media player software application (e.g., a smartphone), smart speaker, or an in-vehicle media playback device, and a media-delivery system such as a streaming media-based system. This is for convenience only and is not intended to limit the application of the present invention. After reading the following description, it will be apparent to one skilled in the relevant art how to implement the following disclosure in alternative embodiments, such as by or other media-playback devices now or future known, and other types of media-delivery systems now or future known.

A play request is a command, instruction, or other signal that causes playback of a media content item from a media content item playback system. A play request can be received by the media-playback system in any of a variety of different forms, such as from a processed voice request received by a voice interface that receives an utterance (e.g., a signal caused by the utterance "Play Led Zeppelin"), from actuation of a hardware button (e.g., a signal caused by actuation of a play button of an in-vehicle media playback device or received from a remote control device that receives a signal from a three-button remote of headphones), from actuation of a virtual button (e.g., a signal caused by actuation of a software play button on a media player software application), or from a remote computing device (e.g., from a remote computing device that receives a play command from another device), among other forms. The play request includes an indication to cause playback of a media content item, but need not (and in certain cases does not) include an identification sufficient to determine a specific media content item to played.

A media content item is an item of media content, such as audio, video, or other types of media content. The media content item can be stored in any format suitable for storing media content. Non-limiting examples of media content items include songs, music, albums, audiobooks, music videos, movies, television episodes, podcasts, other types of audio or video content, and portions or combinations thereof.

An ambiguous play request is a play request that lacks an identification of what media content item to play. There exists various examples in which play requests are ambiguous play requests. For example, a smart speaker may have a hardware play button that, when actuated, generates a play request but lacks an indication of what media content item to play. Some virtual play buttons, such as a play button on a user interface of a software media player can also generate an ambiguous play request when actuated. For instance, the virtual play button may not be associated with a particular media content item and instead may be a general play button. In another example of an ambiguous play request is the voice command "play" received by a voice-based user interface (e.g., a virtual assistant of a computing device). The voice command is ambiguous because the voice command does not specify what media content item to play.

In addition, whether a play request is ambiguous can depend on aspects of the media playback service that receives the request. For instance, "play something happy" would not be ambiguous to some media playback services able to handle requests to play kinds of music rather than specific media content items. In some examples, commands such as "play Spotify" or "play music" may be ambiguous, however, because although they specify an attribute of the media content to play, the potential number of media content items to play is so large and broad in scope that the command is unusable as a play request.

Resolving ambiguous play requests present technical challenges in media content item playback systems. Current solutions for responding to ambiguous play requests simply involve resuming playback if the media-playback device is in a paused state. If the media-playback device is not in a paused state, then the media-playback device plays a content item from a library of media content items (e.g., the alphabetically first media content item of a media content item library). But current solutions are simplistic and may not accurately reflect what the user actually meant when initiating the play request.

A technical solution to this challenge involves determining whether to resume a suspended media content item (e.g., a paused media content item) or play an alternate media content item based on factors in order to improve the accuracy of how a media playback system resolves ambiguous play requests. Such factors can include, for example, a length of time that a suspended media content item has been suspended, detected activity data, a media content item type, a state (e.g., a workout state or an at-home state), or a change in state. A state is a particular condition that a user (or a media-playback device) is in at a particular time, such as a work state, an exercise state, or a party state.

In an example scenario, a media content item player of a smartphone streams heavy-metal music of a workout playlist from a media-delivery system while a user is running. The user finishes running, and the media content item player then receives a suspend playback command (e.g., by receiving a selection of pause button from a touchscreen of the smartphone or by handing a headphone-disconnect event from an operating system of the smartphone responsive). The currently-playing media content item becomes a suspended media content item in response to the suspend playback command. The user returns home, and a few hours later, a smart speaker in the user's home that is connected to the media-delivery system receives the voice command "play". The voice command is processed and it is determined that the play request is ambiguous because it lacks an indication of what to play. Existing solutions treat such an ambiguous play request as a request to resume playback from the time the pause button was selected. In the specific scenario described, resuming playback would result in resuming playback in the middle of a heavy-metal song, which may be undesirable because the media content item was played a few hours prior on a different device while the user was in a different state (e.g., a workout state compared to an at-home state).

By contrast, an example embodiment of the present invention takes into account various factors such as the amount of time since the media content item was suspended, the change in states (e.g., from a workout state to an at home state), the type of media content item (e.g., a song rather than, for example, a podcast), or combinations thereof can determine that, responsive to the ambiguous play request, playing an alternate media content item would be more advantageous than resuming playback of the suspended media content item.

Disclosed examples can be used to determine whether to play a suspended media content item or an alternate media content item. The determination can be made based on a variety of factors, such as a length of time that the suspended media content item has been suspended, a media content item type, detected activity data, a state, or change of state, among other factors. Responsive to the determination, playback of the suspended or alternate media content item is initiated.

System for Responding to an Ambiguous Media Playback Request

FIG. 1 illustrates an example media-playback system 10 able to respond to a play request 14 that is ambiguous. The media-playback system 10 includes a media-playback device 100 and a media-delivery system 700. The media-playback device 100 and the media-delivery system 700 are communicatively coupled via a network 140. The media-playback device 100 receives the play request 14 and provides output in response thereto.

The media-playback device 100 is a computing device usable to play media content items. In some examples, the media-playback device 100 is a smartphone, smart speaker, laptop, media streaming device, or vehicle audio system, though the media-playback device 100 can take other forms. The media-playback device 100 includes a user interface 110.

The user interface 110 operates to provide output to and receive input from a user. In an example, the user interface 110 is a physical device that interfaces with the user (e.g., touch screen display). In an example, the user interface 110 is a combination of devices that interact with the user (e.g., speaker and microphone for providing an utterance-based user interface). The user interface 110 provides user interface elements via which the media-playback device 100 can receive input from a user and take actions in response thereto.

In some examples, the user interface 110 includes a hardware play button 112. The hardware play button 112 is a physical user-actuatable control that, when actuated, causes the media-playback device 100 (e.g., a media-playback software application thereof) to receive a signal associated with a play command.

In some examples, the user interface 110 includes a virtual play button 114 is a software user-actuatable control that, when actuated, causes the media-playback device 100 (e.g., a media-playback engine thereof) to receive a signal associated with a play command. The virtual play button 114 can be actuated in a variety of different ways, such as by receiving input over a touch-sensitive screen or being selected from a pointing device (e.g., a mouse or virtual reality hand controllers).

In some examples, the user interface 110 includes a voice-based user interface 116. A voice-based user interface 116 is a system of one or more components configured to take action in response to an utterance. In some examples, the voice-based user interface 116 interacts with a natural language understanding system (e.g., natural language understanding system 170) to process the utterance.

In examples, the media-playback device 100 includes disambiguation instructions 150. The disambiguation instructions 150 are computer-executable instructions that, when executed, generate a response to a play request 14 that is ambiguous. For instance, the disambiguation instructions 150 can cause execution of one or more operations associated with the processes described in connection with FIGS. 2-6. In some examples, the disambiguation instructions 150 are located at the media-delivery system 700. In some examples, the disambiguation instructions 150 are located at the media-playback device 100.

The network 140 is an electronic communication network that facilitates communication at least between the media-playback device 100 and the media-delivery system 700.

The media-delivery system 700 includes the disambiguation instructions 150, a playback state information data store 160, and a plurality of media content items, including a suspended media content item 152 and an alternate media content item 154.

A suspended media content item 152 is a media content item that had its playback suspended (e.g., stopped or paused) most recently for a given level of granularity (e.g., on a per-user, per-device, or per account basis). The suspended media content item 152 itself can be stored in memory at the media-playback device 100 or the media-delivery system 700. In some examples, the suspended media content item 152 had its playback suspended prior to being completed. An identifier of the suspended media content item 152 can be stored in the playback state information data store 160. Media content items can be suspended in any of a variety of ways, such as in response to receiving a suspend command over the user interface 110. In some examples, the suspended media content item 152 is unique on a per-account basis. For instance, there is a single suspended media content item 152 for a given user's account. If a first media content item is played on a first device associated with an account and playback is suspended, the first media content item is the suspended media content item for any device currently associated with the account. Further, if a second media content item were played by a second device on the account, then the second media content item would be the suspended media content item 152 rather than the first media content item. In other examples, the suspended media content item 152 is unique on a per-device basis, such that each device can have a different suspended media content item 152. A suspended media content item 152 can be stored in a memory device as described below in connection with FIGS. 7A and 7B.

An alternate media content item 154 is a media content item other than the suspended media content item 152. In some examples, the alternate media content item 154 is not predetermined. For instance, a specific media content item is selected as the alternate media content item 154 after the media-playback system 10 determines to play the alternate media content item 154. For instance, after determining to play the alternate media content item 154 rather than the suspended media content item 152, a media content item to play is selected using a particular technique (e.g., at random, based on a taste profile of a user, or based on a list of liked media content items). In some examples, one or both of the suspended media content item 152 and the alternate media content item 154 are stored on the media-playback device 100. An alternative media content item 154 can be stored in a memory device as described below in connection with FIGS. 7A and 7B.

The playback state information data store 160 stores playback state information for a given user, device, or account. The playback state information is data regarding playback of media content items, typically by an account associated with the media-playback device 100. The playback state information stored by the playback state information data store 160 includes, for example, playback status (e.g., playing, paused, stopped), an identifier of a suspended media content item 152, a status changed timestamp describing the time when the playback status last changed, an identifier of a current media content item (e.g., a uniform resource identifier thereof), a media content item type of the current media content item (e.g., music, podcast, audiobook, or movie), a device on which the media content item was played (e.g., a phone, tablet, laptop, vehicle device, or smart speaker), and a state associated with playback of the media content item (e.g., driving, running, or studying). In the illustrated example, the playback state information data store 160 is located at the media-delivery system 700. In other examples, some or all of the playback state information in the playback state information data store 160 is stored local to the media-playback device 100. The playback state information may, but need not be, stored as part of a same data structure (e.g., a same database or same table of a same database). An example configuration of a media data store that stores data, including playback state information, is described relation to in FIG. 8.

In some examples, the media-delivery system 700 includes a natural language understanding system 170. The natural language understanding system 170 is one or more software or hardware components that process natural language input and produces an output based thereon. An example process usable by the natural language understanding system 170 is described in connection with FIG. 9. In some examples, the disambiguation processes are implemented by the natural language understanding system 170. For instance, the natural language understanding system 170 causes execution of a disambiguation process (e.g., as described in the disambiguation instructions 150) in response to determining that an input that it is processing is ambiguous. The output of the disambiguation process is used to improve the response of the media-playback system 10 to the play request 14. By using the disambiguation process to disambiguate ambiguous input, the natural language understanding system 170 is better able to interact with users, thereby improving the natural language understanding system 170.

Additional example details regarding the media-playback system 10 and components thereof are described in connection with FIG. 7. A process used by the media-playback system 10 to process the play request 14 in an improved manner is described in connection with FIG. 2.

Process for Responding to Ambiguous Play Requests

Figure 2:
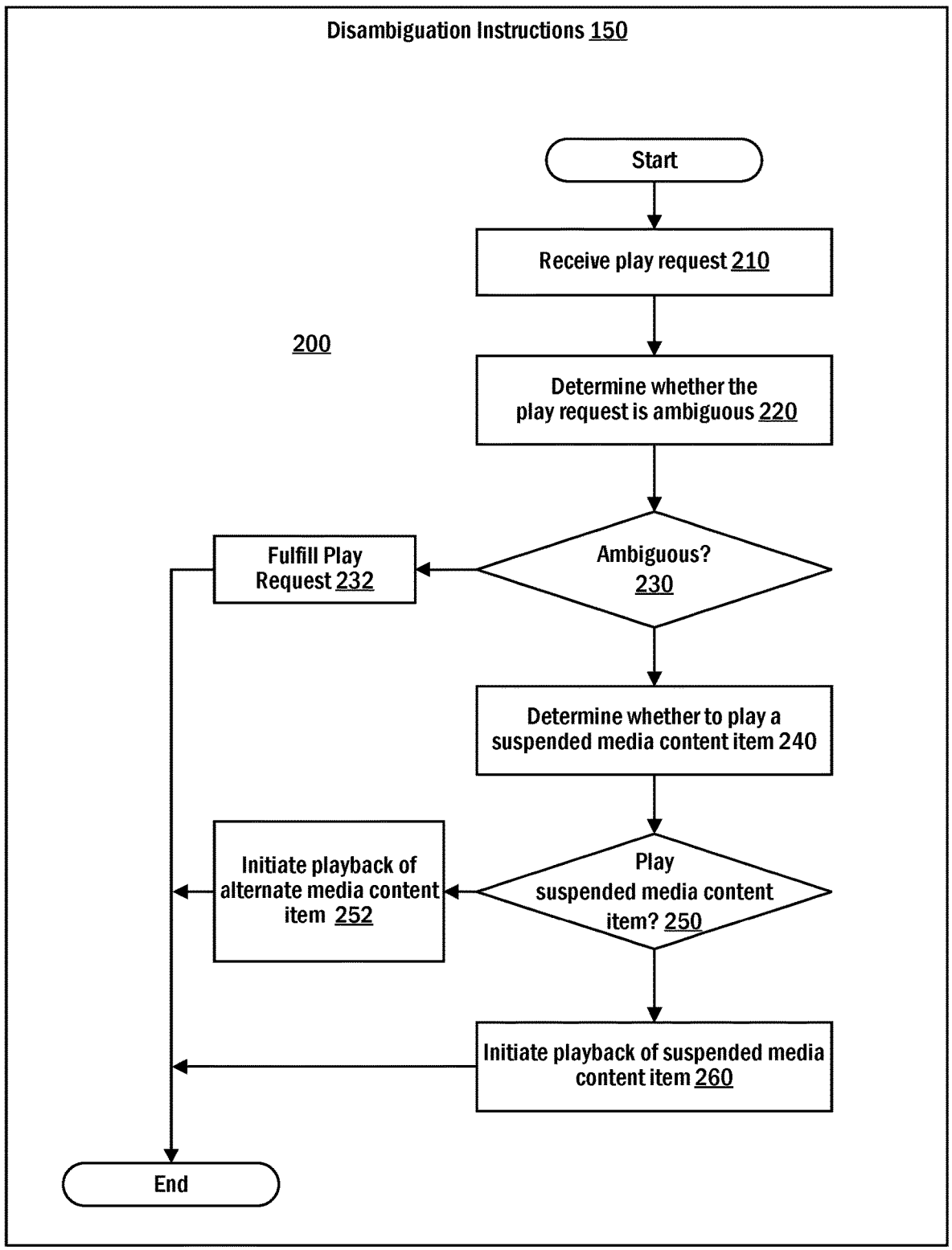
FIG. 2 illustrates a process for responding to a play request that is ambiguous.

FIG. 2 illustrates a process 200 for responding to a play request 14 that is ambiguous. In the illustrated example, the disambiguation instructions 150 include instructions for performing one or more operations of the process 200. In examples, the process 200 is performed by the media-playback device 100, the media-delivery system 700, or combinations thereof. The process 200 begins with operation 210.

Operation 210 includes receiving a play request 14. The play request 14 can be received in any of a variety of ways, such as over the user interface 110. In an example, the play request 14 is received over an application programming interface. Additional details regarding receiving the play request 14 are described in connection with FIG. 3. Following operation 210, the flow moves to operation 220.

Operation 220 includes determining whether the received play request 14 is ambiguous. The play request 14 is ambiguous if it lacks an identification of what media content item to play. Determining that the play request 14 is ambiguous can include analyzing the play request 14 and data associated therewith to determine if the play request 14 includes an identification of a particular media content item to play. If the play request 14 lacks the identification, then it is ambiguous, otherwise it is not ambiguous. Additional details regarding determining whether the received play request 14 is ambiguous are described below in connection with FIG. 3. Following operation 220, the flow moves to operation 230.

At operation 230, if the play request 14 is not ambiguous, the flow moves to operation 232. If the play request 14 is ambiguous, the flow moves to operation 240.

Operation 232 includes fulfilling the play request 14 and then the process 200 ends. Because operation 232 is reached if the play request 14 is not ambiguous, the play request 14 includes an identification of a media content item to play. The media-playback device 100 fulfills the play request 14 by playing the identified media content item, such as by streaming the identified media content item from the media-delivery system 700 to the media-playback device 100 or by playing the media content item from local storage of the media-playback device.

Operation 240, which is reached if the play request 14 is ambiguous, includes determining whether to play a suspended media content item 152 or an alternate media content item 154. The determination can be made based on a length of time that the suspended media content item 154 has been suspended, a media content item type of the suspended media content item 154, a state, among other factors, or combinations thereof. For example, it can be determined to playback the suspended media content item if one, two, or three of the following factors are satisfied: the media content item has been suspended for less than a threshold amount of time (e.g., four hours), the media content item type is in a resume media content item type set (e.g., a set of media content item types that indicate that playback should be resumed, such as a set including podcast, audiobook, television show, and movie media content item types), and past and current states are the same (e.g., the suspended media content item was previously played while in a studying state and the current state is also a studying state). In some examples, the determination is made based on a playback history of the user. For instance, the playback history may indicate whether the user typically resumes playback or plays an alternate media content item in certain scenarios. In examples, there is an artificial intelligence (e.g., an artificial neural network) trained on the user's playback history and configured to output whether to resume a suspended media content item based on input regarding a given context (e.g., including information regarding the suspended media content item 152). In some examples, the media-playback system 10 asks the user whether to resume the suspended media content item 152 or to play an alternate media content item, and the media-playback system 10 makes the determination based on the user's response. Example processes for making the determination are described in connection with FIGS. 4-6.

At operation 250, if the process 200 determines to play the suspended media content item, then the flow of the process 200 moves to operation 260, otherwise the flow of the process 200 moves to operation 252.

Operation 252 includes initiating playback of an alternate media content item 154. In some examples, the operation 252 includes selecting a media content item to play as the alternate media content item 154. The media content item can be selected in any of a variety of ways. In some examples, a media content item is selected at random. In some examples, the media-playback device 100 asks the user (e.g., via an audio or visual prompt) which media content item to play and then initiates playback of that media content item. In some examples, the media content item is selected based on a taste profile of a user of the media content item 100. In some examples, the media content item is selected from one or more media content items recommended for the user, such as is described in US 2018/0189306, filed Dec. 30, 2016, and entitled "MEDIA CONTENT ITEM RECOMMENDATION SYSTEM", which is incorporated herein by reference for any and all purposes. In some examples, the alternate media content item 154 is predetermined and operation 252 includes initiating playback of the predetermined media content item. After playback is initiated, the flow of the process 200 ends.

Operation 260 includes initiating playback of a suspended media content item 260. In some examples this includes resuming playback the suspended media content item 260 from a last-played position in the suspended media content item 260. In other examples, initiating playback of the suspended media content item 260 includes starting playback of the suspended media content item 260 from a beginning of the suspended media content item 260. In some examples, initiating playback of the suspended media content item 260 includes playing a next media content item from a context (e.g., album or playlist) of the suspended media content item 260, which may be useful if playback of the suspended media content item 260 was almost finished when it was suspended. Then the flow of the process 200 ends.

Receiving Play Request and Determining Whether a Play Request is Ambiguous

Figure 3:
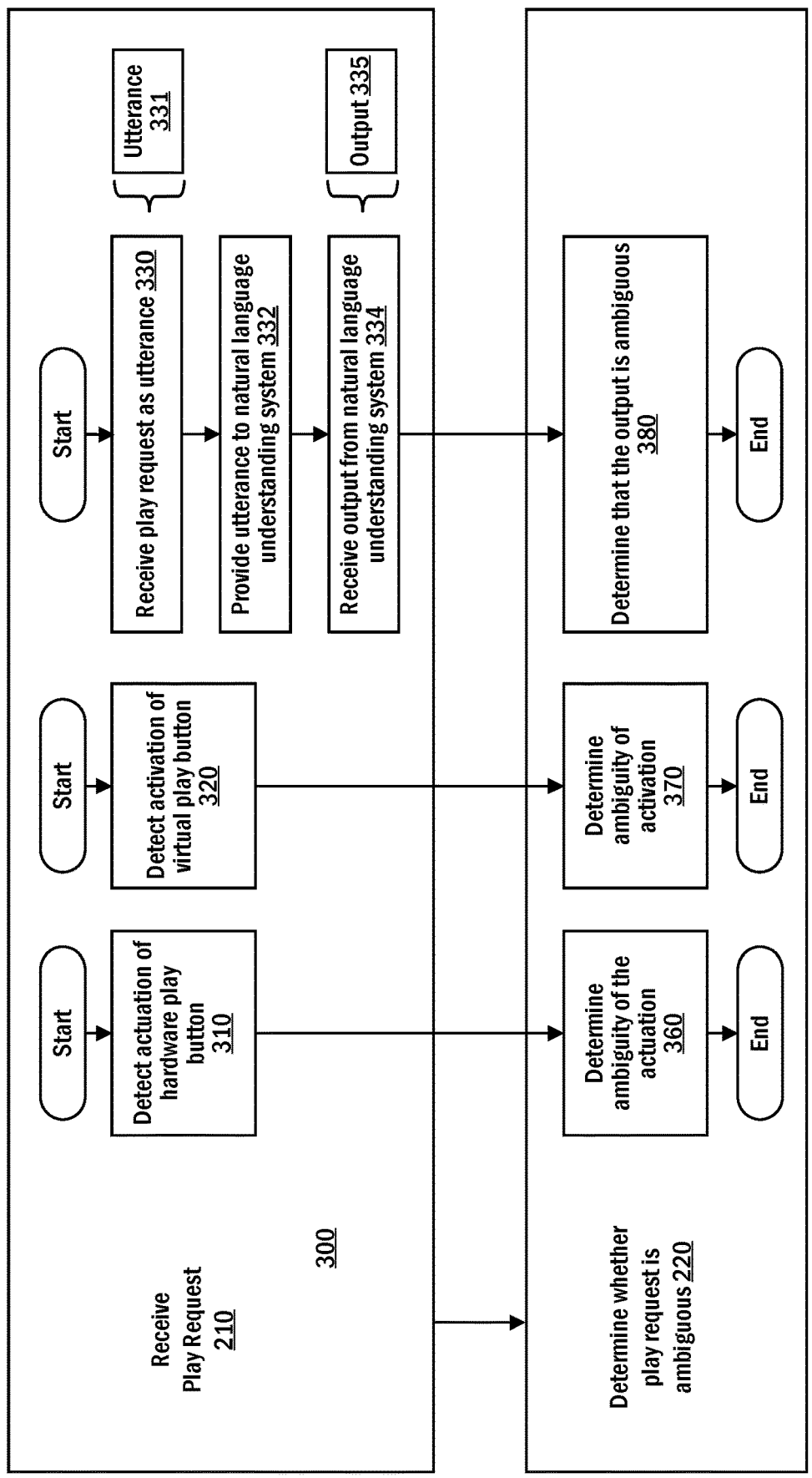
FIG. 3 illustrates a process for receiving a play request and determining whether the play request is ambiguous.

FIG. 3 illustrates a process 300 for receiving a play request 14 and determining whether the play request 14 is ambiguous.

In an example, receiving a play request 14 and determining whether the play request 14 is ambiguous are based on actuation of a hardware play button, as shown in operation 310 and operation 360. In the illustrated example, receiving the play request 14 in operation 210 includes operation 310, which detects actuation of a hardware play button, and determining whether the play request 14 is ambiguous in operation 220 includes operation 360, which determines ambiguity of the actuation.

Operation 310 includes detecting actuation of the hardware play button 112. The operation 310 includes receiving an indication that a hardware play button 112 was actuated (e.g., the indication can be a digital or analog signal received from a mechanical switch of the hardware play button 112). The indication is the play request 14. For instance, a media-player application operating on the media-playback device 100 receives or detects an event from an operating system on the device indicating that the hardware play button 112 was actuated. Following operation 310, the flow moves to operation 360.

Operation 360 includes determining the ambiguity of the play request 14 associated with the actuation of the hardware play button 112 received in operation 310. In some examples, operation 360 includes determining that the play request 14 is ambiguous responsive to determining that the play request 14 is responsive to the hardware play button 112 being actuated. In such examples, all play requests 14 from actuation of the hardware play button 112 are determined to be ambiguous. In other examples, play requests 14 associated with actuation of hardware play buttons are not automatically considered ambiguous. For instance, some media-playback devices 100 may have a hardware play button 112 used as a selector in conjunction with other hardware buttons (e.g., directional selector buttons) to select and play specific media content items (e.g., as displayed on a screen of the media-playback device 100). In such examples, the play request 14 is associated with actuation of the hardware play button 112 is not an ambiguous play request because the actuation is associated with activity on the user interface 110 indicating that a particular media content item is to be played.

In an example, receiving the play request 14 and determining whether the play request 14 is ambiguous are based on activation of the virtual play button 114 as described in operation 320 and operation 370. In the illustrated example, receiving the play request 14 in operation 210 includes detecting activation of a virtual play button in operation 320, and determining whether the play request is ambiguous in operation 220 includes determining the ambiguity of the activation in operation 370.

Operation 320 includes detecting activation of the virtual play button 114. The operation 320 includes receiving an indication that the virtual play button 114 was activated, and the indication is treated as a play request 14 by the media-playback device 100. For instance, a media-player application operating on the media-playback device 100 receives or detects an event from an operating system on the device indicating that a virtual play button 114 was clicked, tapped, or otherwise activated. Following operation 320, the flow moves to operation 370.

Operation 370 includes determining the ambiguity of the play request 14 associated with activation of the virtual play button 114. In some examples, play requests 14 associated with activation of virtual play buttons 114 are not automatically considered ambiguous. For instance, the user interface of the 114 may often provide virtual play buttons 114 in conjunction with a media content item, such that activation of the virtual play button 114 is determined to be a request to play the media content item. In other examples, because of the virtual nature of the virtual play button 114, some operating systems or media-playback applications deactivate virtual play buttons 114 unless they are associated with a media content item.

Some user interfaces 110 have virtual play buttons 114 that can be activated without being associated with a media content item. In such examples, the play request 14 associated with activation of the virtual play button 114 is an ambiguous play request because the activation is not associated with a particular media content item.

In an example, receiving a play request 14 and determining whether the play request 14 is ambiguous is based on an utterance, as described in operations 330, 332, 334, and 380. In the illustrated example, receiving the play request 14 in operation 210 includes operations 330, 332, and 334, and determining whether the play request is ambiguous in operation 220 includes operation 380.

Operation 330 receiving the play request 14 as an utterance 331. In an example, the media-playback device 100 includes a voice-based user interface 116, which can receive voice commands from users in the form of utterances. Receiving the play request 14 as the utterance 331 includes receiving the utterance 331 over the voice-based user interface 116 (e.g., one or more microphones thereof). Following operation 330, the flow moves to operation 332.

Operation 332 includes providing the utterance 331 to the natural language understanding system 170. Providing the utterance 331 can include transmitting the utterance 331 (e.g., data representative thereof) to the natural language understanding system 170 for processing. In some examples, the natural language understanding system 170 is local to the media-playback device, and providing the utterance 331 includes making the utterance 331 available to the local natural language understanding system 170 (e.g., via programming calls). In examples, the natural language understanding system 170 is remote from the media-playback device 100 (e.g., located at the media-delivery system 700), and providing the utterance 331 to the natural language understanding system 170 includes transmitting the utterance 331 the remote natural language understanding system 170.

Operation 334 includes receiving an output 335 of the natural language understanding system 170. For example, the natural language understanding system 170 processes the utterance 331 and provides the output 335 based thereon.

Operation 380 includes determining that the output 335 is ambiguous. For example, the output 335 may indicate that the utterance includes a request to play media content in general but lacks an indication of a specific media content item to play. In such an example, the output 335 indicates that the play request associated with the utterance 331 is ambiguous. In some examples, the output 335 is in the form of a slot-intent model. In such examples, determining that the output is ambiguous includes determining that the output 335 includes a play intent and lacks a slot value indicating a media content item to play. Additional details regarding natural language processing by the natural language understanding system 170 are described in connection with FIG. 9.

Figure 4:
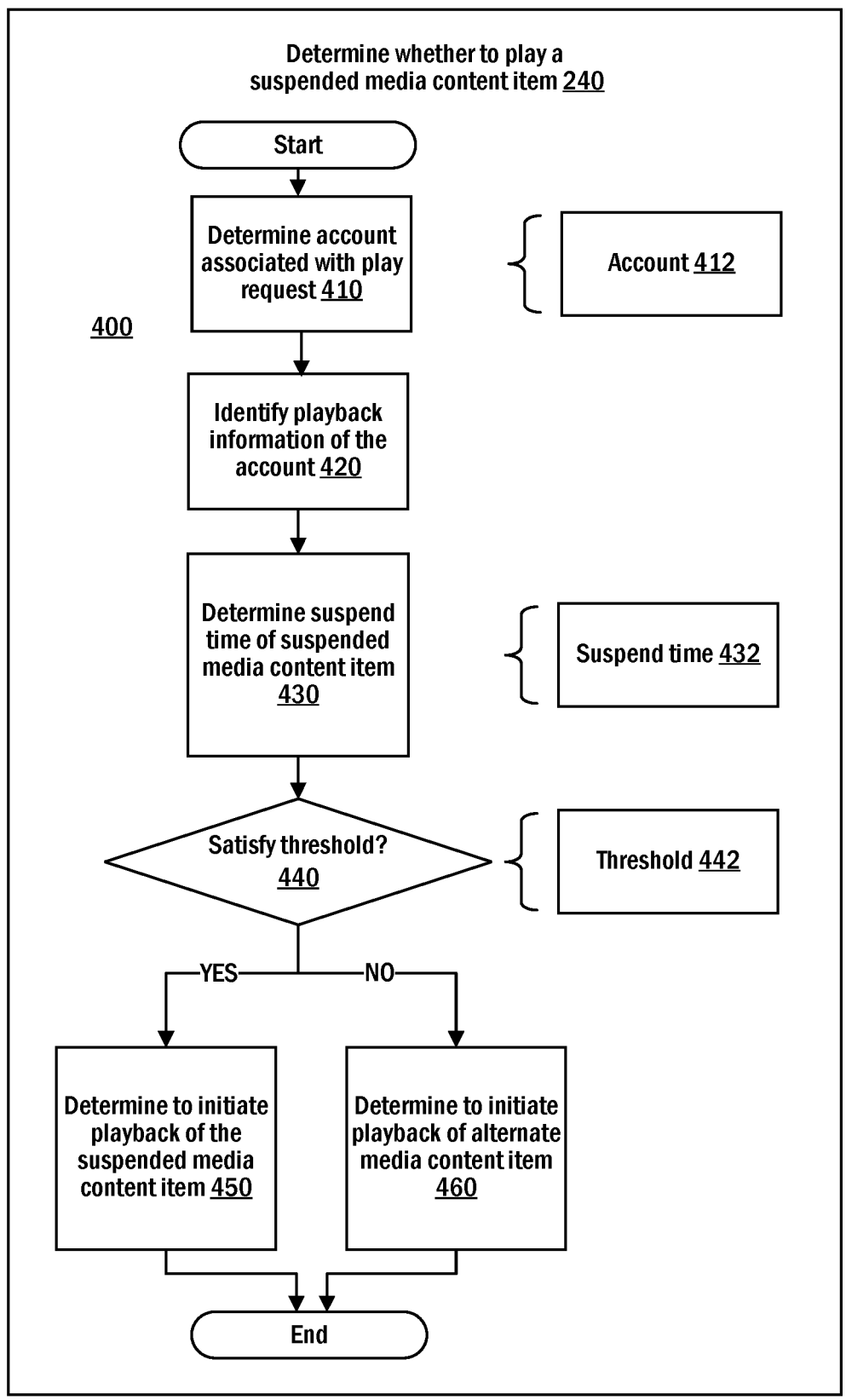
FIG. 4 illustrates an example process for determining whether to play a suspended media content item.

Determining Whether to Play a Suspended Media Content Item Based on a Suspend Time FIG. 4 illustrates an example process 400 for determining whether to play a suspended media content item 152 based on a suspend time. The process begins with operation 410.

Operation 410 includes determining an account 412 associated with the play request 14. In some examples, the play request 14 is received at a media-playback application of the media-playback device 100. In such examples determining the account 412 includes determining an account 412 associated with the media-playback application. For instance, the media-playback application stores an identifier of the account 412 (e.g., credentials used to access services provided by the media-delivery system 700 associated with the account 412. In some examples, the play request 14 is received at the media-delivery system 700, and the play request 14 (or a message used to transmit the play request 14) includes an identifier usable to determine the account 412. In some examples, the account 412 is determined prior to determining whether to play a suspended media content item 240. Following operation 410, the flow of the process 400 moves to operation 420.

Operation 420 includes identifying playback state information associated with the account 412. In an example, identifying the playback state information associated with the account 412 includes obtaining data from a playback state information data store 160 based on an identifier of the account 412. Following operation 420, the flow of the process 400 moves to operation 430.

Operation 430 includes determining a suspend time 432 of the suspended media content item 152. A suspend time 432 is an indicator of an amount of time for which the suspended media content item 152 has been suspended. In some examples, the suspend time 432 is the amount of time itself (e.g., four hours) or is a timestamp (e.g., a timestamp of when playback was suspended or timestamp of when playback was last started). In some examples, determining the suspend time 432 includes extracting or calculating the suspend time 432 based on data from the identified playback state information. In examples determining the suspend time 432 includes subtracting a timestamp of when playback was suspended from a current time. In some examples, determining the suspend time 432 includes subtracting a timestamp of when playback was last started from a current time and, optionally, adding an amount of time representative of a last-played portion of the media content item. For instance, if playback was last started at 12:00, a current time is 13:00, and a last-played position of the media content item is forty minutes, then the suspend time 432 is twenty minutes.

At operation 440, if the suspend time 432 satisfies a threshold 442, then the flow of the process 400 moves to operation 450, which includes determining to initiate playback of the suspended media content item 152. If the suspend time 432 does not satisfy the threshold 442, then the flow moves to operation 460, which includes determining to initiate playback of an alternate media content item 154. In examples, the threshold 442 is an amount of time. In examples, the threshold 442 is determined based on characteristics of the suspended media content item 152 (for instance as described below in relation to FIG. 6). Determining whether the suspend time 432 satisfies the threshold 442 includes comparing the suspend time 432 to the threshold 442. For instance, the threshold 442 may be four hours and the threshold 442 is determined to be satisfied if the suspend time 432 is less than four hours. In other examples, the comparison is based on timestamps. For instance, the threshold 442 may be a timestamp calculated based on the current time (e.g., four hours in the past) and the threshold 442 is satisfied if the suspend time 432 is a timestamp that occurred more recently than the timestamp of the threshold 442.

Determining Whether to Play a Suspended Media Content Item Based on States

Figure 5:
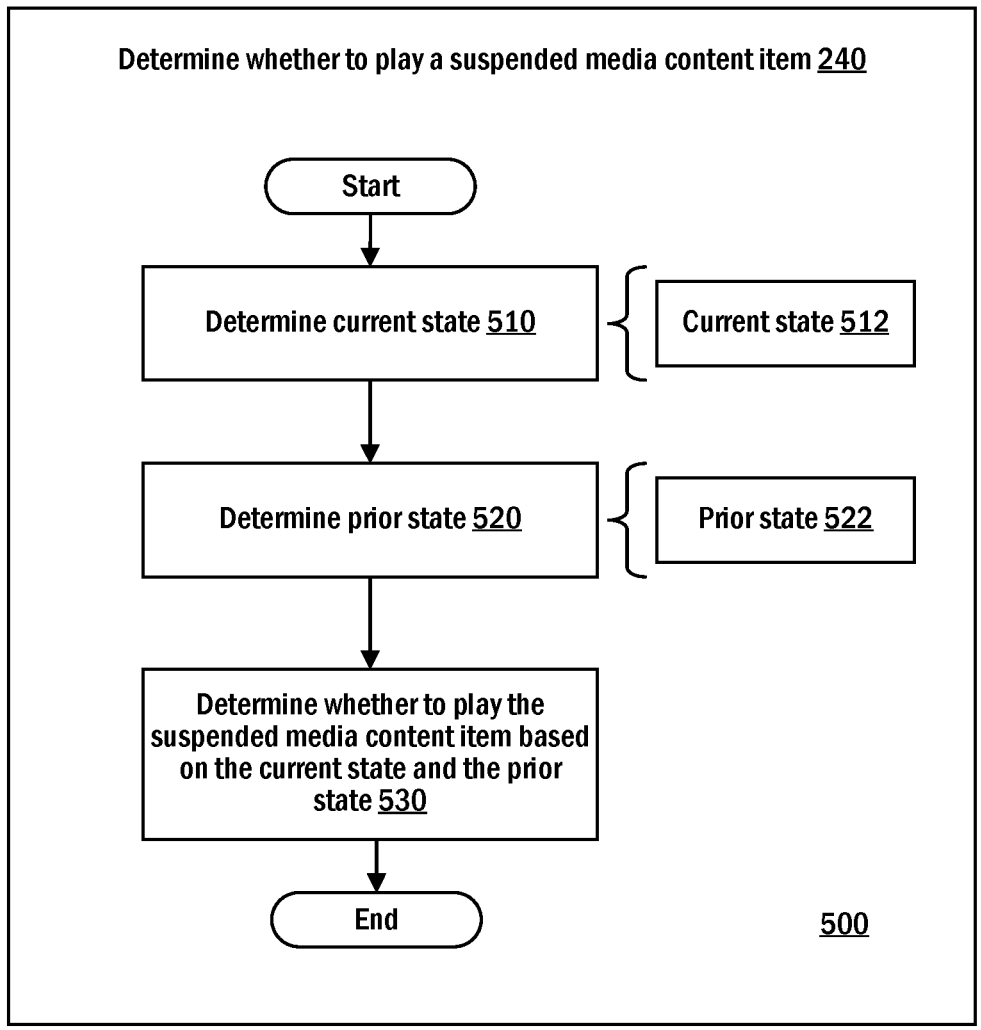
FIG. 5 illustrates an example process for determining whether play a suspended media content item.

FIG. 5 illustrates an example process 500 for determining whether play a suspended media content item 152 based on states. A state is a particular condition that a user (or a media-playback device) is in at a particular time, such as a work state, an exercise state, or a party state. The process 500 begins with operation 510.

Operation 510 includes determining (e.g., predicting) the state at a present time, which can be referred to as a current state 512. The media-playback device 100 can use one or more sensors of the media-playback device 100 to determine the current state 512. For instance, a location sensor of the media-playback device 100 can be used to determine whether the user is in an at-home state or an at-work state. In examples, the current state 512 is determined using techniques described in US 2018/0189226, titled "MEDIA CONTENT PLAYBACK WITH STATE PREDICATION AND CACHING" and filed Dec. 31, 2016, which is incorporated herein by reference for any and all purposes.

Operation 520 includes determining (e.g., predicting) state prior to the current state 512, referred to as a prior state 522. The prior state 522 is the state in which the suspended media content item 152 was being played when the suspended media content item 152 was suspended. In examples, the playback state information data store 160 stores data regarding the prior state 522. In other examples, the prior state 522 is inferred based on, for example, the context from which the suspended media content item 152 was being played. For example, if the suspended media content item 152 was being played from a playlist titled "running music", then the prior state 522 is inferred to be a running state.

Operation 530 includes determining whether to play the suspended media content item based on the current state 512 and the prior state 522. Whether the current state 512 is different from the prior state 522 can be used to determine whether to play the suspended media content item 152 or the alternate media content item 154. For example, a user that last listened to the suspended media content item 152 while in a party state (e.g., while hosting a party) and is currently in a study state would likely not want to resume playback of the suspended media content item 152 (e.g., because the type of media content item suitable for a party is likely very different from a type of media content item suitable for studying). In this instance, the process 500 can determine that a change in state occurred and, based on the change in state, determine to initiate playback of the alternate media content item 154 in response to an ambiguous play request.

In examples, not only is a change in state analyzed, but also how similar or dissimilar media content items associated with those states are. For instance, a user that last listened to the suspended media content item 152 while in a running state and is currently in a workout state may very well want to listen to the same media content item. This can be determined by comparing the type of media content items that media-playback system 10 played for the user in each of the states. For instance, if the media content items are sufficiently similar (e.g., their similarity passes a threshold such that a user would likely want to listen to both media content items in the current state), then the suspended media content item 152 can be resumed even if the current state 512 is different from the prior state 522. An example process for determining similarity of media content items is described in U.S. Pat. No. 8,073,854, entitled "DETERMINING THE SIMILARITY OF MUSIC USING CULTURAL AND ACOUSTIC INFORMATION" and issued Dec. 6, 2011, which is incorporated herein by reference for any and all purposes.

Figure 6:
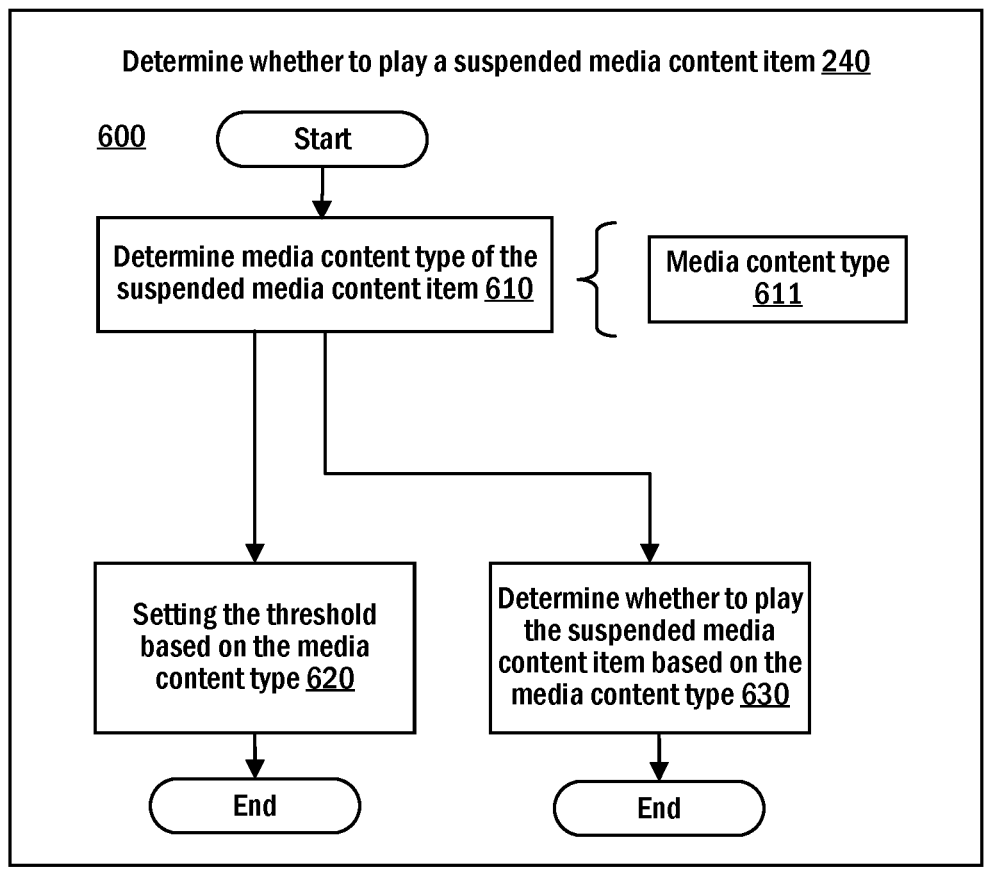
FIG. 6 illustrates an example process for determining whether play a suspended media content item.

Determining Whether to Play a Suspended Media Content Item Based on a Media Content Type FIG. 6 illustrates an example process 600 for determining whether to play a suspended media content item 152. The process 600 begins with operation 610.

Operation 610 includes determining a media content type 611 of the suspended media content item 152. The media content type 611 can be determined using the metadata of the suspended media content item 152. For instance, the metadata of the suspended media content item 152 can include a content type field. In examples, the media-delivery system 700 includes a data store having data regarding the media content types for media content, and the media content type 611 can be determined by querying the metadata. Following operation 610, the flow of the process 600 can move to one or both of operation 620 and operation 630.

Operation 620 includes setting the threshold 442 based on the media content type 611. As described above in relation to FIG. 4, determining whether to play the suspended media content item 152 can include determining whether the suspend time 432 satisfies the threshold 442. In examples, the threshold 442 can be set or modified based on the media content type 611. For example, there can be rules that set the threshold 442 based on the media content type 611, such as setting the threshold 442 to four hours if the suspended media content item 152 is a song and setting the threshold to eight hours otherwise. The setting of the threshold 442 can reflect that users may be more interested in continuing certain types of media content items than others. For instance, a user may prefer to resume a suspended podcast or audiobook that was suspended a long time, but would not prefer to resume a suspended song over the same period of time.

Operation 630 includes determining whether to play the suspended media content item 152 based on the media content type 611. In examples, the determination can include determining whether the media content type 611 is of a first media content type. For instance, in some implementations the operation can include determining to play the suspended media content item 152 if the media content type 611 is a podcast or audiobook and to play the alternate media content item 154 otherwise.

System

Figure 7A:
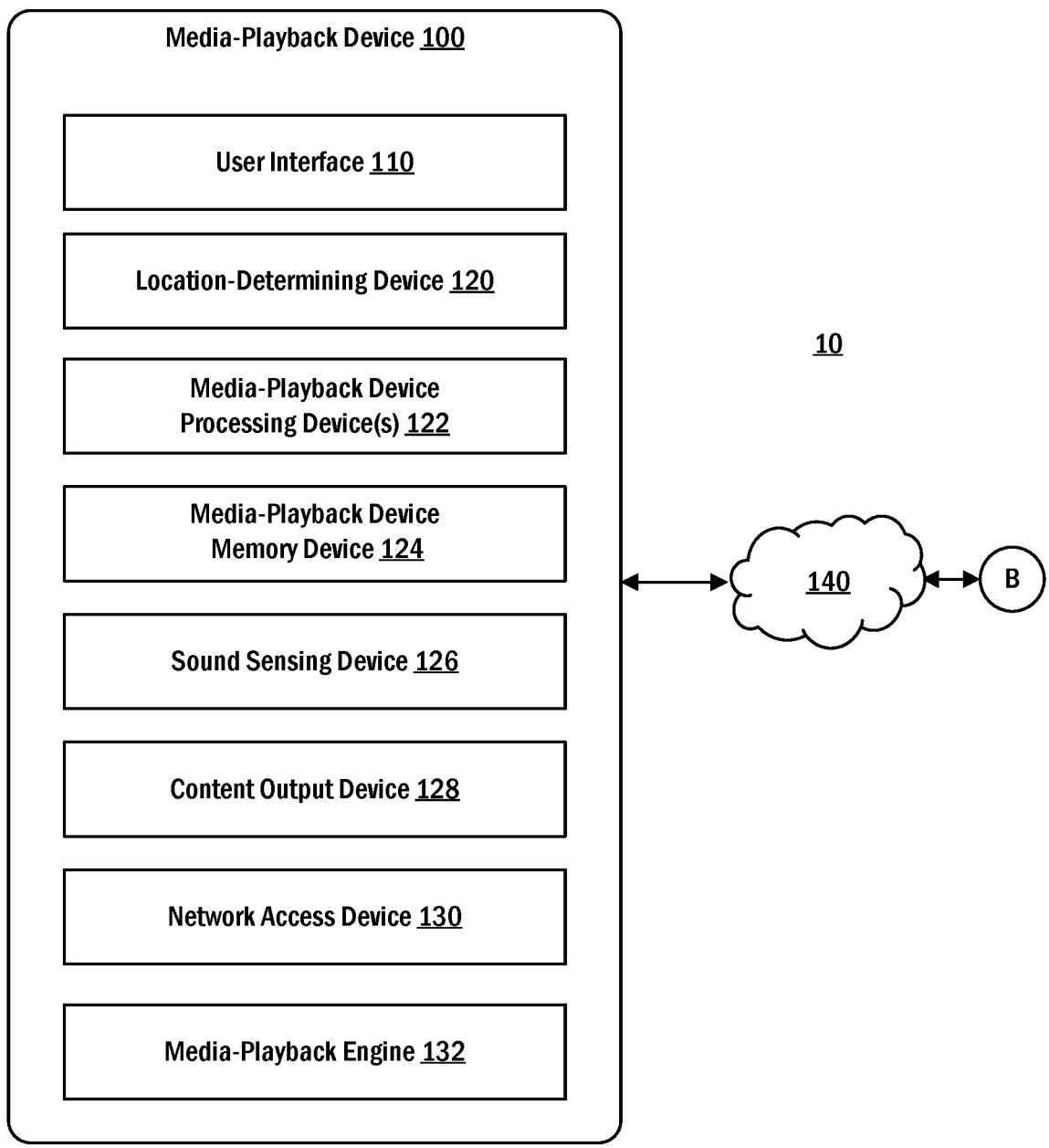
FIG. 7, which is made up of FIG. 7A and FIG. 7B, illustrates an example system able to respond to ambiguous play requests.
Figure 7B:
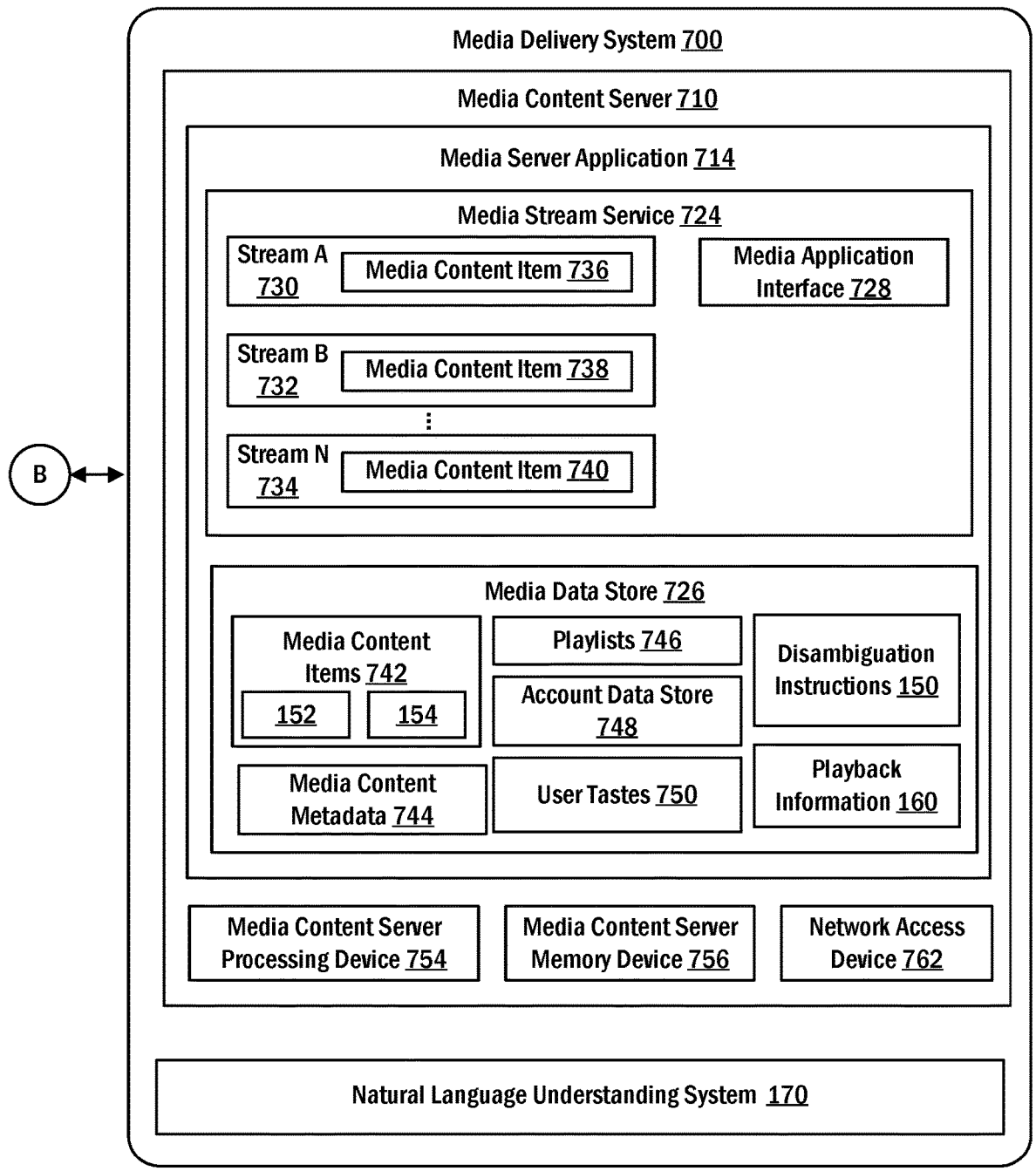

FIG. 7, which is made up of FIG. 7A and FIG. 7B, illustrates an example implementation of the media-playback system 10. The system 10 illustrates the media-playback device 100 and the media-delivery system 700 connected over the network 140.

Media-Playback Device

The media-playback device 100 is a computing device able to play media content items (e.g., produce visual or audio output) for a user. In some examples, the media content items are provided by the media-delivery system 700 and transmitted to the media-playback device 100 using the network 140. In examples, the media-playback device 100 is a handheld entertainment device, smartphone, tablet, watch, wearable device, or any other type of device capable of playing media content. In yet other examples, the media-playback device 100 is a media playback appliance, such as an in-dash vehicle head unit, an aftermarket vehicle media playback appliance, a smart assistant device, a smart home device, a virtual reality device, an augmented reality device, a television, a gaming console, a set-top box, a network appliance, a BLU-RAY disc player, a DVD player, a media player, a stereo system, smart speaker, an Internet-of-things device, or a radio, among other devices or systems.

The media-playback device 100 plays media content items for a user. The media content items are selectable for playback with user input. The media content items can also selectable for playback without user input, such as by the media-playback device 100 or the media-delivery system 700. In an example, the media content items are selected for playback by the media-delivery system 700 based on a user taste profile stored in association with the account 412.

In some examples, the media-playback device 100 plays media content items that are provided (e.g., streamed) by a system external to the media-playback device 100, such as the media-delivery system 700, another system, or a peer device. Alternatively, in some examples, the media-playback device 100 plays media content items stored locally on the media-playback device 100. Further, in at least some examples, the media-playback device 100 plays media content items that are stored locally as well as media content items provided by other systems, such as the media-delivery system 700.

The media-playback device 100 selects and plays media content items and generates interfaces for controlling playback of the media content items. In some examples, the media-playback device 100 receives user input over the user interface 110, such as a touch screen user interface, an utterance-based user interface, tactile user interfaces, virtual user interfaces, other user interfaces, or combinations thereof, and the media-playback device 100 plays a media content item based thereon. The media-playback device 100 can include other input mechanisms including but not limited to a keypad and/or a cursor control device. The keypad receives alphanumeric characters and/or other key information. The cursor control device includes, for example, a handheld controller or mouse, a rotary input mechanism, a trackball, a stylus, and/or cursor direction keys.

In some examples, the user interface 110 includes a touch-screen-based user interface. A touch screen operates to receive an input from a selector (e.g., a finger, stylus, etc.) controlled by the user. In some examples, the touch screen operates as both a display device and a user input device. In some examples, the user interface 110 detects inputs based on one or both of touches and near touches. In some examples, the touch screen displays a user interface for interacting with the media-playback device 100. Some examples of the media-playback device 100 do not include a touch screen.

Examples of the user interface 110 include input control devices that control the operation and various functions of the media-playback device 100. Input control devices include any components, circuitry, or logic operative to drive the functionality of the media-playback device 100. For example, input control device(s) include one or more processors acting under the control of an application.

In some examples, the media-playback device 100 includes one or more media-playback device processing devices 122, and a media-playback device memory device 124. In an example, the media-playback device 100 includes a content output device 128. In an example, the media-playback device 100 includes a movement-detecting device. In an example, the media-playback device 100 includes a network access device 130. In an example, the media-playback device 100 includes a sound-sensing device 126. Other examples may include additional, different, or fewer components.

The location-determining device 120 is a device that determines the location of the media-playback device 100. In some examples, the location-determining device 120 uses one or more of the following technologies: Global Positioning System (GPS) technology that receives GPS signals from satellites, cellular triangulation technology, network-based location identification technology, WI-FI positioning systems technology, ultrasonic positioning systems technology, and combinations thereof. Examples of the location-determining device 120 further include altitude- or elevation-determining devices, such as barometers.

While some examples of the media-playback device 100 do not include a display device, where a media-playback device 100 does include a display device, the media-playback device 100 will often include a graphics subsystem and coupled to an output display. The output display uses various technologies, such as TFT (Thin Film Transistor), TFD (Thin Film Diode), OLED (Organic Light-Emitting Diode), AMOLED (active-matrix organic light-emitting diode) display, and/or liquid crystal display (LCD)-type displays. The displays can also be touch screen displays, such as capacitive and resistive-type touch screen displays.

The one or more media-playback device processing devices 122 include one or more processing units, such as central processing units (CPU), digital signal processors, and field-programmable gate arrays, among others.

The media-playback device memory device 124 operates to store data and instructions. In some examples, the media-playback device memory device 124 stores instructions to perform one or more operations described herein. Some examples of the media-playback device memory device 124 also include a media content cache. The media content cache stores media content items, such as media content items that have been previously received from the media-delivery system 700. The media content items stored in the media content cache are storable in an encrypted or unencrypted format, and decryption keys for some or all of the media content items are also stored. The media content cache can also store metadata about media content items such as title, artist name, album name, length, genre, mood, or era. The media content cache can also store playback state information about the media content items, such as the number of times the user has requested to playback the media content item or the current location of playback. The playback state can further include data regarding playback status (e.g., playing, paused, stopped), a status changed timestamp describing the time when the playback status last changed, an identifier of a current media content item (e.g., a uniform resource identifier thereof), a media content item type of the current media content item (e.g., music, podcast, audiobook, or movie), a device on which the media content item was played (e.g., a phone, tablet, laptop, vehicle device, or smart speaker), and a state associated with playback of the media content item (e.g., driving, running, or studying).

The media-playback device memory device 124 typically includes at least some form of computer-readable media. Computer-readable media includes any available media that can be accessed by the media-playback device 100. By way of example, computer-readable media include computer-readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read only memory, electrically erasable programmable read only memory, flash memory and other memory technology, compact disc read only memory, BLU-RAY discs, DVD discs, other optical storage, magnetic cassettes, magnetic tape, magnetic disk storage or other magnetic storage devices, or any other medium that can be used to store the desired information and that can be accessed by the media-playback device 100. In some examples, computer-readable storage media is non-transitory computer-readable storage media.

Computer-readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

In an example, the media-playback device 100 has the one or more media-playback device processing devices 122 coupled to the media-playback device memory device 124 storing media-playback device instructions which when executed cause the one or more media-playback device processing devices 122 to perform one or more operations described herein.

The content output device 128 operates to output media content. In some examples, the content output device 128 provides media output for a user. In some examples, the content output device 128 provides media output to another device, such as wireless speaker. Examples of the content output device 128 include a speaker assembly having one or more speakers, an audio output jack, a BLUETOOTH transmitter, a display panel, and a video output jack. Other examples are possible as well, such as transmitting a signal through the audio output jack or BLUETOOTH transmitter to reproduce an audio signal by a connected or paired device such as headphones, speaker system, or vehicle head unit.

The network access device 130 operates to communicate with other computing devices over one or more networks, such as the network 140. Examples of the network access device include one or more wired network interfaces and wireless network interfaces. Examples of wireless network interfaces include infrared, BLUETOOTH wireless technology, WI-FI, 802.11a/b/g/n/ac, and cellular or other radio frequency interfaces.

In some examples, the media-playback device 100 includes a movement-detecting device that senses movement of the media-playback device 100, acceleration of the media-playback device 100, determines an orientation of the media-playback device 100, or includes other detecting devices. In at least some examples, the detecting devices include one or more accelerometers or other motion-detecting technologies or orientation-detecting technologies.

In some examples, the media-playback device 100 includes a media-playback engine 132 that operates on the media-playback device 100. For instance, the media-playback engine 132 can be a media-playback software application. The media-playback engine 132 selects and plays back media content and generates interfaces for selecting and playing back media content items. In some examples, a user can interact with the media-playback engine 132 over the user interface 110. In examples, the media-playback engine 132 obtains one or more media content items from the media delivery server. In examples, the media content items are streamed from the media delivery system 700. In other examples, the media content items are downloaded to the media-playback device 100 for later playback.

Network

The network 140 is an electronic communication network that facilitates communication at least between the media-playback device 100 and the media-delivery system 700. An electronic communication network includes a set of computing devices and links between the computing devices. The computing devices in the network use the links to enable communication among the computing devices in the network. The network 140 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various examples, the network 140 includes various types of links. For example, the network 140 includes wired and/or wireless links, including BLUETOOTH, ultra-wideband (UWB), 802.11, ZIGBEE, cellular, and other types of wireless links. Furthermore, in various examples, the network 140 is implemented at various scales. For example, the network 140 is implemented as one or more vehicle area networks, local area networks (LANs), metropolitan area networks, subnets, wide area networks (such as the Internet), or can be implemented at another scale. Further, in some examples, the network 140 includes multiple networks, which may be of the same type or of multiple different types.

Media-Delivery System

The media-delivery system 700 includes one or more computing devices and provides media content items to the media-playback device 100 and, in some examples, other media-playback devices as well. In the illustrated example, the media-delivery system 700 includes a media content server 710 and the association server 190. Although FIG. 7B shows a single instance of the media content server 710, some examples include multiple servers. In these examples, each of the multiple servers may be identical or similar and may provide similar functionality (e.g., to provide greater capacity and redundancy, or to provide services from multiple geographic locations). Alternatively, in these examples, some of the multiple servers may perform specialized functions to provide specialized services (e.g., natural language processing or disambiguation of ambiguous requests, etc.). Various combinations thereof are possible as well. The media-delivery system 700 includes a natural language understanding system 170.

The media content server 710 transmits stream media to media-playback devices, such as the media-playback device 100. In some examples, the media content server 710 includes a media server application 714, one or more media content server processing devices 754, a media content server memory device 756, and a media content server network access device 762.

In some examples, the media server application 714 streams music or other audio, video, or other forms of media content. The media server application 714 includes a media stream service 724, a media data store 726, and a media application interface 728. The media stream service 724 operates to buffer media content such as media content items 736, 738, and 740, for streaming to one or more streams 730, 732, and 734.

The media application interface 728 can receive requests or other communication from media-playback devices or other systems, to retrieve media content items from the media content server 710. For example, the media application interface 728 receives communication from the media-playback engine 132 of the media-playback device 100.

In some examples, the media data store 726 stores media content items 742, media content metadata 744, and playlists 746. The media data store 726 may store one or more databases and file systems, such as the set of data structures 800 described in relation to FIG. 8. As noted above, the media content items 742 may be audio, video, or any other type of media content, which may be stored in any format for storing media content.

The account data store 748 is used to identify users. In an example, the account data store 748 is used to identify users of a media streaming service provided by the media-delivery system 700. In some examples, the media-delivery system 700 authenticates a user via data contained in the account data store 748 and provides access to resources (e.g., media content items 742, playlists 746, etc.) to a device operated by a user. In some examples, different devices log into a single account and access data associated with the account in the media-delivery system 700. User authentication information, such as a username, an email account information, a password, and other credentials, can be used for the user to log into his or her user account. A device can use stored credentials to log a user into the account on a device.

The media data store 726 includes user tastes data 750. The user tastes data 750 includes but is not limited to user preferences regarding media content items, such as media content items that the user likes/dislikes, media content item qualities that the user likes/dislikes, historical information about the user's consumption of media content, libraries of media content items, and playlists of media content items, among other user data.

The media content metadata 744 operates to provide various information associated with the media content items 742. In some examples, the media content metadata 744 includes one or more of title, media content type, artist name, album name, length, genre, mood, era, acoustic fingerprints, and other information. The playlists 746 operate to identify one or more of the media content items 742 and in some examples, the playlists 746 identify a group of the media content items 742 in a particular order. In other examples, the playlists 746 merely identify a group of the media content items 742 without specifying a particular order. Some, but not necessarily all, of the media content items 742 included in a particular one of the playlists 746 are associated with a common characteristic such as a common genre, mood, or era. The playlists 746 can include user-created playlists, which may be available to a particular user, a group of users, or to the public.

In some examples, the media server application 714 or a dedicated access management server provides access management services. In examples, the media server application 714 exposes application programming interface endpoints usable by calling devices or functions to use access management services, such as services for logging in to an account, obtaining credentials associated with an account, generating credentials associated with an account, and other services.

Although in FIG. 7 only a single media-playback device 100 and media-delivery system 700 are shown, in accordance with some examples, the media-delivery system 700 supports the simultaneous use of devices, and the media-playback device 100 and other devices can simultaneously access media content from multiple media-delivery systems 700. Additionally, although FIG. 7 illustrates a streaming media-based system for media playback, other examples are possible as well. For example, in some examples, the media-playback device 100 includes a media data store and the media-playback device 100 selects and plays back media content items without accessing the media-delivery system 700. Further in some examples, the media-playback device 100 operates to store previously-streamed media content items in a local media data store (e.g., in a media content cache).

In at least some examples, the media-delivery system 700 streams, progressively downloads, or otherwise communicates music, other audio, video, or other forms of media content items to the media-playback device 100 for later playback. In accordance with an example, the user interface 110 receives a user request to, for example, select media content for playback on the media-playback device 100.

Set of Data Structures

Figure 8:
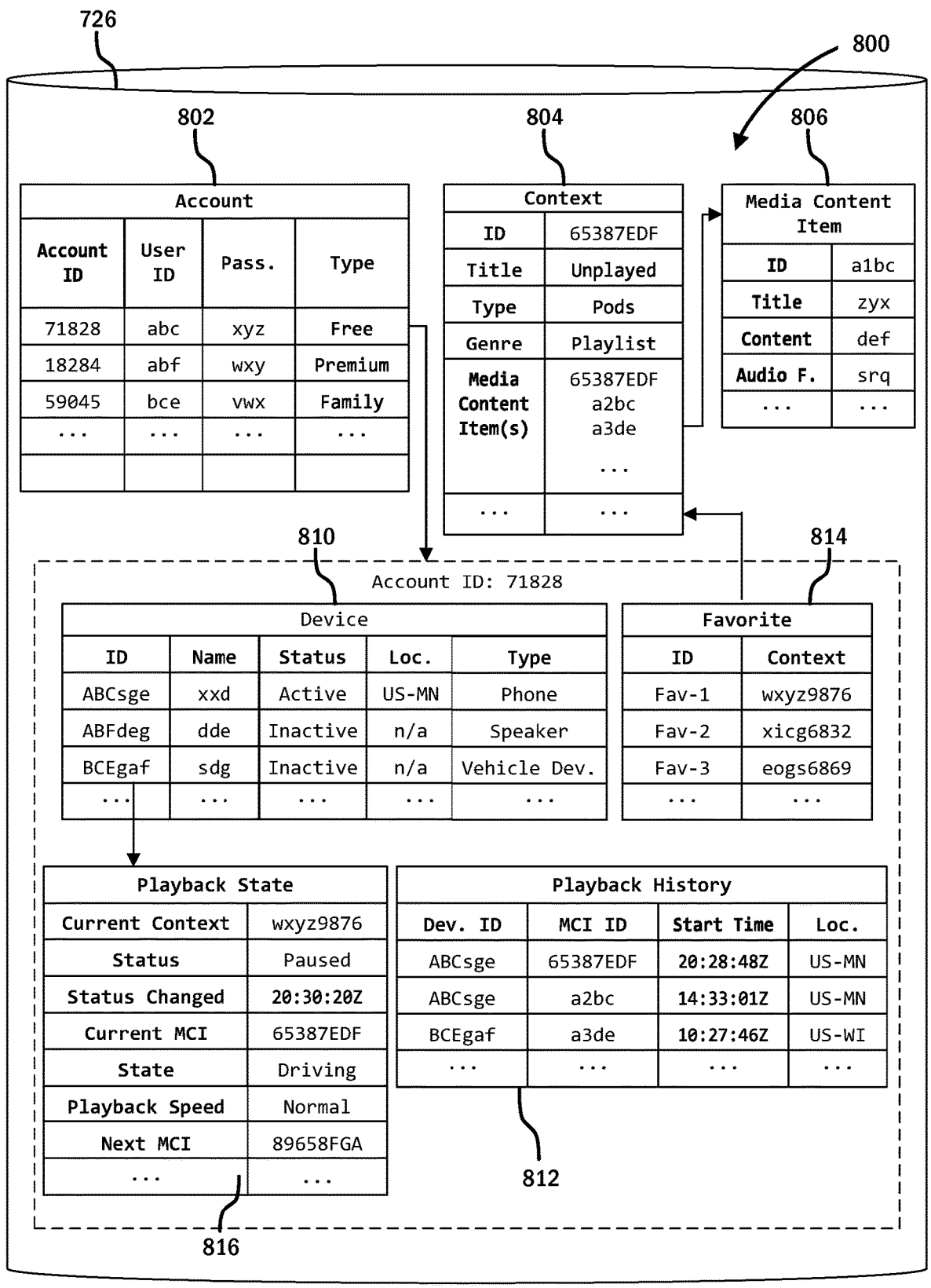
FIG. 8 illustrates an example set of data structures storable in a media data store and usable to respond to a play request that is ambiguous.

FIG. 8 illustrates an example set of data structures 800 storable in the media data store 726. As illustrated, the set of data structures 800 includes an account table 802, a media content item context data structure 804, and a media content item data structure 806. For each account record in the account table 802, the set of data structures 800 includes a device data table 810, a playback history table 812, a favorite table 814, and a playback state data structure 816. It is noted that, where user data is used, it can be handled according to a defined user privacy policy and can be used to the extent allowed by the user. Where the data of other users is used, it can be handled in an anonymized matter so the user does not learn of the details of other users generally or specifically. In addition, the data contained in the set of data structures 800 is stored according to a defined security policy and in accordance with applicable regulations.

As illustrated, each account record in the account table 802 has a relationship with a device data table 810, a playback history table 812, and a favorite table 814. Each device record in the device data table 810 has a relationship with a playback state data structure 816. Each device record in a favorite table 814 has a relationship with a media content item context data structure 804. Each context data structure has a relationship with the media content item data structure 806.

The account table 802 stores one or more account records usable to identify accounts of the media-delivery system 700. In an example, where a particular account is referred to in this disclosure (e.g., the account 412), that account is associated with an entry stored in the set of data structures 800. In an example, when the media-playback device 100 sends the play request 14 to the media-delivery system 700, the play request 14 includes an identifier usable to identify the account 412 of a user of the media-playback device 100. Then the media-delivery system 700 locates an account record using the identifiers that corresponds to the account 412 in the account table 802. The media-delivery system 700 then uses the data associated with the account record in the account table 802 to provide services associated with the account 412. For instance, the media-delivery system 700 provides a media content item described in the favorite table 814 to the media-playback device 100 and updates the playback history table 812 and the playback state tables 816 accordingly.

The account table 802 references one or more other tables, and is referenced by one or more other tables. In an example, each account record of the account table 802 corresponds to an account. For instance, the account 412 can correspond to an account record in the account table 802. Each account record of the account table 802 includes data associated with one or more fields of the account table 802, such as an account ID field, a user ID field, a password field, and a type field. The account ID field stores an identifier of the account record, such as using a number. The user ID field stores an identifier of a user, such as the user's name. The password field stores data associated with a password of the user, such as a hashed and salted password. The type field identifies subscription types associated with the account record.

Each account record identified in the account table 802 is associated with, and identifies, data for providing various services from the media-delivery system 700. In some examples, the data includes the device data table 810, the playback history table 812, the favorite table 814, and the playback state data structure 816, among others. In the illustrated example, the tables 810, 812, and 814 are primarily described in association with a single record (e.g., the record having the Account ID:71828). However, it is understood that, in other examples, the tables 810, 812, and 814 are structured to be associated with a plurality of accounts The device data table 810 identifies one or more devices associated with a particular account record of the account table 802. The device data table 810 is referenced by the account table 802 or other tables. The device data table 810 can reference one or more other tables.

In an example, each device record of the device data table 810 includes data associated with a device. For instance, a first device record of the device data table 810 corresponds to the media-playback device 100, and a second device record of the device data table 810 corresponds to another device associated with the same account (e.g., a smart speaker system or an in-vehicle device). Each device record of the device data table 810 includes data associated with one or more fields of the device data table 810, such as a device ID field (e.g., storing device identifier data, such as an alphanumeric identifier), a name field (e.g., for storing a device name), a status field (e.g., for storing a status of the device, such as whether the device is currently active or inactive), a location field (e.g., for storing a last-known location of the device), and type field (e.g., for storing a type of the device, such as a phone device, a speaker device, or a vehicle head unit).

The playback history table 812 describes the media content items played by the account by storing one or more playback records. The playback history table 812 can reference and be referenced by one or more other tables. In an example, each playback record of the playback history table 812 includes data associated with a media content item played by a respective account or device. Each playback record of the playback history table 812 includes data associated with one or more fields of the playback history table 812, such as a device ID field (e.g., for storing an identifier of the device that caused playback of the playback record), an MCI (Media Content Item) ID field (e.g., for storing an identifier of the media content item that was played), a start time field (e.g., for identifying the start time at which the media content item was played back), and a location field (e.g., for identifying the location of the device associated with the device ID when playback was initiated).

The favorite table 814 describes information about favorite media content item contexts associated with the account by storing one or more favorite records. The favorite table 814 includes information about favorites associated with an account. The favorite table 814 can reference and be referenced by one or more other tables. In an example, each favorite record of the favorite table 814 includes data associated with a favorite media content item context (e.g., album or playlist). Each favorite record of the favorite table 814 includes data associated with one or more fields of the favorite table 814, such as an ID field (e.g., for identifying the favorite record) and a context field (e.g., for identifying a media content item context associated with the favorite record).

The context data structure 804 is a data structure (e.g., record of a table or other data structure) that contains data associated with a media content item context (e.g., album or playlist). The context data structure 804 can reference and be referenced by one or more tables or other data structures. The context data structure 804 stores data regarding a particular media content item context in one or more fields, such as an ID field (e.g., for identifying the context data structure 804), a title field (e.g., a string naming the context data structure 804), a type field (e.g., for describing the type of the media content item context, such as a playlist, album, or television season), and media content item field (e.g., for identifying one or more media content items of the context data structure 804)

The media content item data structure 806 is a data structure (e.g., record of a table or other data structure) that contains data associated with a media content item. The media content item data structure 806 can reference and be referenced by one or more tables or other data structures. The media content item data structure 806 stores data regarding a particular media content item in one or more fields, such as an ID field (e.g., storing an identifier of the media content item data structure 806), a title field (e.g., storing a title of the media content item data structure 806, such as a song title), a content field (e.g., storing the content of the media content item or a link to the content of the media content item data structure 806, such as the audio content of a song), and an audio fingerprint field. In an example, the audio fingerprint field stores an audio fingerprint of the content of the media content item data structure 806.

The playback state data structure 816 is a data structure (e.g., a record of a table or other data structure) that contains data associated with a state of a device (e.g., a state associated with a device record of the device data table 810). The playback state data structure 816 can reference and be referenced by one or more tables or other data structures. The playback state data structure 816 stores data regarding a particular playback state in one or more fields, such as a playback status field (e.g., playing, paused, stopped, etc.), a timestamp of when the playback status changed, a current context field (e.g., describing a current context from which a device is playing, such as by containing an identifier of the context), a current MCI (Media Content Item) (e.g., describing a current media content item that is playing, such as by containing an identifier of the media content item), a playback mode field (e.g., describing a playback mode of the device, such as shuffle or repeat), a playback speed field (e.g., describing a current playback speed), and a next MCI field (e.g., describing the next media content item to be played).

Various operations and processes described herein can be performed by the cooperation of two or more devices, systems, processes, or combinations thereof.

Natural Language Understanding Process

Figure 9:
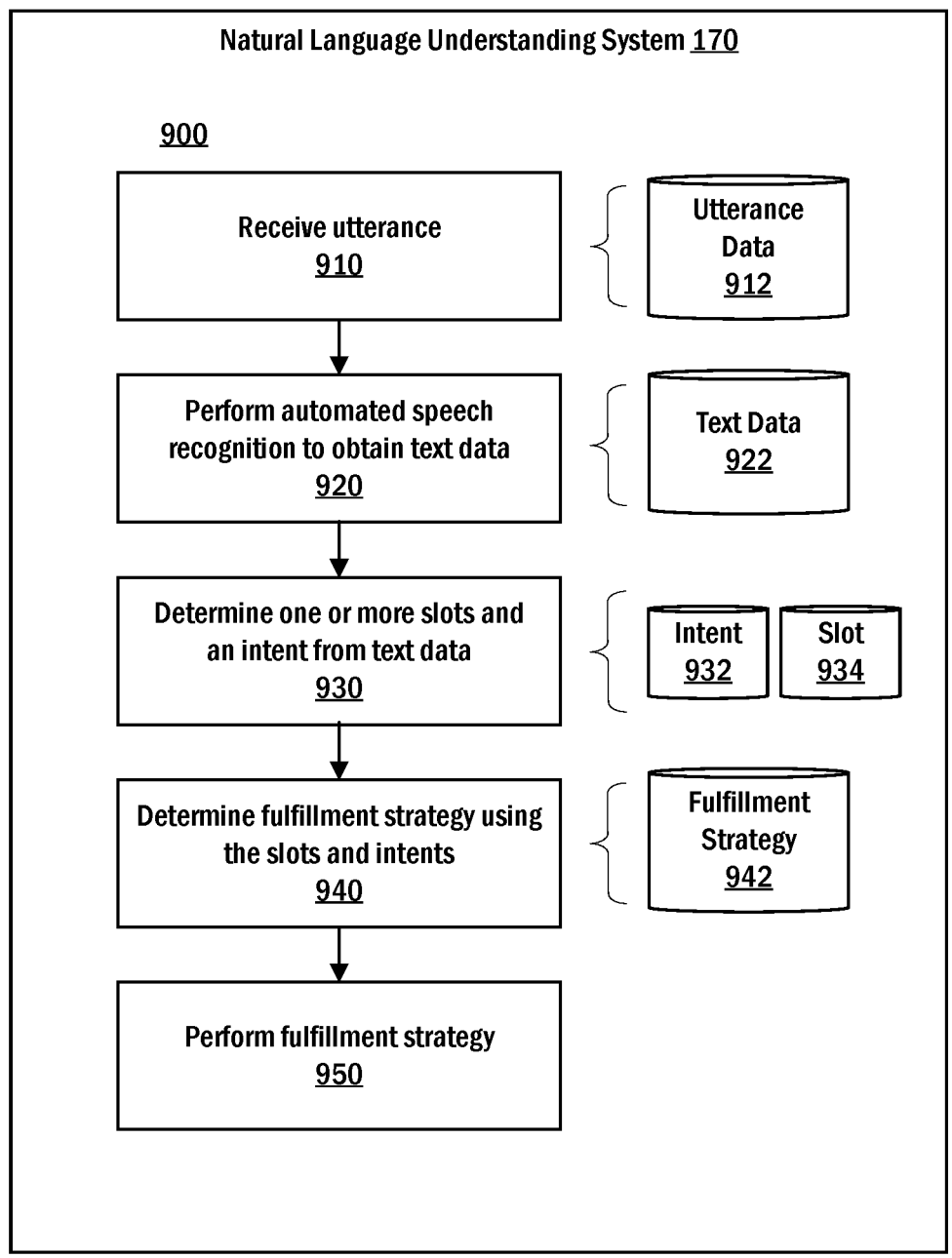
FIG. 9 illustrates an example process used by a natural language understanding system for performing a fulfillment strategy based on a received utterance.

FIG. 9 illustrates an example process 900 used by the natural language understanding system 170 for performing a fulfillment strategy based on a received utterance. As described in this example, the media-delivery system 700 operates the natural language understanding system 170, and the media-playback device 100 provides an utterance (e.g., the play request 14 can be in the form of an utterance from a user) to the media-delivery system 700 for processing at the natural language understanding system 170. This is for example purposes only, and other configurations are possible. For instance, the natural language understanding system 170 is local to the media-playback device 100. The process begins with operation 910.

Operation 910 includes receiving utterance data 912 (e.g., from the media-playback device 100 or the human-machine interface 102 thereof). The utterance data 912 is data describing the utterance (e.g., the utterance 331). In some examples, the utterance data 912 is an audio recording that contains the utterance being spoken. In some examples, the utterance data 912 is received as an entire audio data file. For instance, the media-playback device 100 buffers the utterance data 912 as the utterance data 912 is obtained from the audio input device 104. The buffered utterance data 912 is then sent to the media-delivery system 700 (e.g., the natural language understanding system 170 thereof) for processing. In other instances, the media-playback device 100 streams the utterance data 912 to the media-delivery system 700 in real-time as the utterance data 912 is received from the audio input device 104. In an example, the utterance data 912 is stored (e.g., by the media-delivery system 700) in a data store after the utterance data 912 is received. After the utterance data 912 is received, the flow moves to operation 920.

Operation 920 includes performing automated speech recognition on the utterance data 912 to obtain text data 922. In some examples, performing automated speech recognition includes providing the utterance data 912 as input to an automated speech recognition system and receiving the text data 922 as output from the automated speech recognition system. Automated speech recognition can be performed using any of a variety of techniques (e.g., using hidden Markov models or neural networks). Examples of automated speech recognition systems include CMU SPHINX, maintained by CARNEGIE MELLON UNIVERSITY, and DEEPSPEECH, maintained by the MOZILLA FOUNDATION. After the text data 922 is obtained from the automated speech recognition system, the flow moves to operation 930.

Operation 930 includes determining a slot 934 and an intent 932 from the text data 922. The slot 934 is a key-value pair that describes a portion of the text data 922 having a specific meaning. The intent 932 describes a general intent of the text data 922. As a particular example, if the text data 922 were "play the song Thriller" as input, the intent 932 is "play" and the slot 934 would be the key-value pair {song: Thriller}. Although the example includes just one slot 934 and one intent 932, the output of operation 930 can be more than one slot 934 and more than one intent 932. There are also instances, where there is an intent 932 but no slot 934. For instance, performing operation 930 where the text data 922 is "play" would result in the intent 932 being "play", but would not result in any slots 934 (e.g., the text data 922 does not include a description of what to play). In such an example, a request associated with the utterance is determined to be ambiguous responsive to determining that there is a play intent without a slot. In other instances, there are slots 934 but no intent. For instance, performing operation 930 where the text data 922 is "All Along the Watchtower by Jimi Hendrix" would result in two slots 934 (e.g., {Song: All Along the Watchtower, Artist: Jimi Hendrix}) but no intent 932 (e.g., the text data 922 does not include a description of what to do with the song and artist, such as search, play, or save).

In an example, the operation 930 is performed by a natural language understanding model that is trained to identify the slot 934 and intent 932 for the text data 922 provided as input. The natural language understanding model can be implemented in a variety of ways, including using a state vector machine or a conditional random fields model, among others. With the intent 932 and the slots 934 determined, the flow moves to operation 940.

Operation 940 includes determining a fulfillment strategy 942 using the slot 934 and the intent 932. The fulfillment strategy 942 is a course of action to take which is typically associated with execution of a command or service associated with the intent 932. For instance, where the intent 932 is a play intent, the fulfillment strategy 942 is a play fulfillment strategy and involves the execution of a play command. In an example, there is a fulfillment manager and the operation 940 includes the fulfillment manager selecting the fulfillment strategy 942 from among a plurality of fulfillment strategies. In an example, the fulfillment manager follows a decision tree based the intent 932 and the slot 934. In another example, the fulfillment strategy 942 defines requirements (e.g., a play fulfillment strategy may require a play intent) and the fulfillment manager selects the fulfillment strategy 942 from among the fulfillment strategies based on requirements being met or unmet. In an example, the fulfillment strategy 942 is a disambiguation fulfillment strategy, such as one that causes execution of a disambiguation process, such as one described in relation to FIGS. 2-6. Once the fulfillment strategy 942 is selected, the flow moves to operation 950.

At operation 950, the fulfillment strategy 942 is performed. For example, where the fulfillment strategy 942 is a play fulfillment strategy 942, a media content item associated the slot 934 is selected and playback of the media content item is initiated. In another example, the fulfillment strategy 942 is a list playlists strategy that involves selecting one or more playlists and providing the list as output.

Software examples of the examples presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, magnetic disks, optical disks, magneto-optical disks, or other types of media/machine-readable medium suitable for storing or transmitting electronic instructions. The techniques described herein are not limited to any particular software configuration. They may find applicability in any computing or processing environment. In some examples, there are one or more processors that operate as a particular program product or engine. In some examples, one or more processors are coupled to a memory storing instructions which when executed cause the one or more processors to operate in a particular manner. In some examples, the one or more processors include two or more sets of processors operating on different devices.

The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Further, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some examples include a computer program product. The computer program product may be a storage medium or media having instructions stored thereon or therein which can be used to control, or cause, a computer to perform any of the procedures of the examples of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the examples of the invention. Such software may include without limitation device drivers, operating systems, and user applications. Ultimately, such computer-readable media further include software for performing example aspects of the invention, as described above.

Included in the programming and/or software of the system are software modules for implementing the procedures described above.

Various operations and processes described herein can be performed by the cooperation of two or more devices, systems, processes, or combinations thereof.

While various examples of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. A method comprising:
   receiving a play request;
   determining whether the play request is ambiguous, wherein an ambiguous play request lacks an identification of a media content item to play;
   determining a suspend time of playback of a suspended media content item, the suspend time defining an amount of time for which the suspended media content item has been suspended;
   determining a suspend-time threshold based on a media content type of the suspended media content item; and
   responsive to determining that the play request is ambiguous, controlling, based at least on the determined suspend time and the determined suspend-time threshold, whether to initiate playback of the suspended media content item or rather to initiate playback of an alternate media content item, wherein the controlling includes (i) if the suspend time satisfies the determined suspend-time threshold, then, responsive to the play request, determining to initiate playback of the suspended media content item and (ii) if the suspend time does not satisfy the determined suspend-time threshold, then, responsive to the play request, determining to initiate playback of the alternate media content item.

2. The method of claim 1, wherein the media content type comprises a song, a podcast, an audiobook, a television show, or a movie.

3. The method of claim 1, wherein determining the suspend-time threshold based on the media content type of the suspended media content item comprises:
   determining as the suspend-time threshold a first suspend-time threshold if the suspended media content item is a first media content type; and
   determining as the suspend-time threshold a second suspend-time threshold if the suspended media content item is a second media content type.

4. The method of claim 1, wherein determining the suspend-time threshold based on the media content type of the suspended media content item comprises determining the suspend-time threshold based on whether the media content type is a song.

5. The method of claim 1, further comprising determining, based on metadata of the suspended media content item, the media content type of the suspended media content item.

6. The method of claim 1, wherein receiving the play request comprises receiving an utterance over a voice-based user interface.

7. The method of claim 1, wherein receiving the play request comprises detecting actuation of a hardware play button or a virtual play button.

8. The method of claim 1, further comprising:
   determining a current state of a user; and
   determining a prior state of the user, wherein the prior state of the user is a state that was current when the suspended media content item was last played,
   wherein controlling the media playback is further based on the determined current state of the user and the determined prior state of the user.

9. The method of claim 1, further comprising:
determining a playback history of a user,
wherein the controlling media playback is further based on the determined playback history.

10. The method of claim 9, wherein the playback history of the user is indicative of whether the user resumes playback of suspended media content items or plays other media content in certain scenarios.

11. The method of claim 9, wherein a model is trained on the playback history of the user and configured to output whether to resume the suspended media content item based on input regarding a given context.

12. The method of claim 1, wherein the method is implemented by at least one entity selected from the group consisting of a media-playback device and a media-delivery system.

13. A computing system comprising:
at least one processor;
non-transitory computer-readable storage; and
computer-readable instructions stored in the non-transitory computer-readable storage and executable by the at least one processor to carry out operations including:
receiving a play request,
determining whether the play request is ambiguous, wherein an ambiguous play request lacks an identification of a media content item to play,
determining a suspend time of playback of a suspended media content item, the suspend time defining an amount of time for which the suspended media content item has been suspended,
determining a suspend-time threshold based on a media content type of the suspended media content item, and
responsive to determining that the play request is ambiguous, controlling, based at least on the determined suspend time and the determined suspend-time threshold, whether to initiate playback of the suspended media content item or rather to initiate playback of an alternate media content item, wherein the controlling includes (i) if the suspend time satisfies the determined suspend-time threshold, then, responsive to the play request, determining to initiate playback of the suspended media content item and (ii) if the suspend time does not satisfy the determined suspend-time threshold, then, responsive to the play request, determining to initiate playback of the alternate media content item.

14. The computing system of claim 13, wherein determining the suspend-time threshold based on the media content type of the suspended media content item comprises:
determining as the suspend-time threshold a first suspend-time threshold if the suspended media content item is a first media content type; and
determining as the suspend-time threshold a second suspend-time threshold if the suspended media content item is a second media content type.

15. The computing system of claim 13, wherein determining the suspend-time threshold based on the media content type of the suspended media content item comprises determining the suspend-time threshold based on whether the media content type is a song.

16. The computing system of claim 13, wherein receiving the play request comprises an operation selected from the group consisting of (i) receiving an utterance over a voice-based user interface, (ii) detecting actuation of a hardware play button, and (iii) detecting actuation of a virtual play button.

17. The computing system of claim 13, wherein the operations additionally include:
determining a current state of a user; and
determining a prior state of the user, wherein the prior state of the user is a state that was current when the suspended media content item was last played,
wherein controlling the media playback is further based on the determined current state of the user and the determined prior state of the user.

18. The computing system of claim 13, wherein the operations additionally include:
determining a playback history of a user,
wherein the controlling media playback is further based on the determined playback history.

19. At least one non-transitory computer-readable storage having stored thereon instructions that, when executed by one or more processors cause execution of operations including: receiving a play request; determining whether the play request is ambiguous, wherein an ambiguous play request lacks an identification of a media content item to play; determining a suspend time of playback of a suspended media content item, the suspend time defining an amount of time for which the suspended media content item has been suspended; determining a suspend-time threshold based on a media content type of the suspended media content item; and responsive to determining that the play request is ambiguous, controlling, based at least on the determined suspend time and the determined suspend-time threshold, whether to initiate playback of the suspended media content item or rather to initiate playback of an alternate media content item, wherein the controlling includes (i) if the suspend time satisfies the determined suspend-time threshold, then, responsive to the play request, determining to initiate playback of the suspended media content item and (ii) if the suspend time does not satisfy the determined suspend-time threshold, then, responsive to the play request, determining to initiate playback of the alternate media content item.

20. The at least one non-transitory computer-readable storage of claim 19, wherein determining the suspend-time threshold based on the media content type of the suspended media content item comprises:
determining as the suspend-time threshold a first suspend-time threshold if the suspended media content item is a first media content type; and
determining as the suspend-time threshold a second suspend-time threshold if the suspended media content item is a second media content type.

* * * * *